United States Patent [19]
Booth et al.

[11] Patent Number: 5,344,026
[45] Date of Patent: Sep. 6, 1994

[54] METHOD AND APPARATUS FOR SORTING PLASTIC ITEMS

[75] Inventors: Hubert J. Booth; Paul H. Steagall, III; Michael W. Wright, all of Florence, S.C.

[73] Assignee: Wellman, Inc., Johnsonville, S.C.

[21] Appl. No.: 850,850

[22] Filed: Mar. 13, 1992

Related U.S. Application Data

[63] Continuation-in-part of Ser. No. 669,043, Mar. 14, 1991, abandoned.

[51] Int. Cl.⁵ .............................................. B07B 5/342
[52] U.S. Cl. ..................................... 209/580; 209/588; 209/939
[58] Field of Search ................ 209/522, 523, 524, 539, 209/588, 576, 580, 581, 582, 644, 908, 914, 920, 934, 939

[56] References Cited

U.S. PATENT DOCUMENTS

| | | | |
|---|---|---|---|
| 4,365,719 | 12/1982 | Kelly | 209/914 |
| 4,373,638 | 2/1983 | Schappet | 209/908 |
| 4,919,534 | 4/1990 | Reed | 356/73 |
| 5,090,576 | 2/1992 | Menter | 209/939 |
| 5,141,110 | 8/1992 | Trischan et al. | 209/588 |

FOREIGN PATENT DOCUMENTS 3212432  12/1982  Fed. Rep. of Germany ...... 209/939

Primary Examiner—H. Grant Skaggs
Attorney, Agent, or Firm—Bell, Seltzer, Park & Gibson

[57] ABSTRACT

A method of sorting plastic items by measuring the effect an item has on light directed at a stream of items from a light source, then selectively removing items from the stream based on a comparison of the light measured and the light emitted from the detector is provided. The invention also includes an apparatus for separating plastic items which comprises a light source, a detector for measuring the effect an individual item has on light emitted from the detector, and sortation means for selectively removing items from the stream based on a comparison of the light emitted by the light source and that measured at the detector. A method for separating single plastic bottles from engaged interlocked bottle clusters comprising directing an air jet at an item sufficiently forceful to displace a single bottle to a collection means but insufficiently forceful to displace an interlocked bottle cluster is also provided.

35 Claims, 15 Drawing Sheets

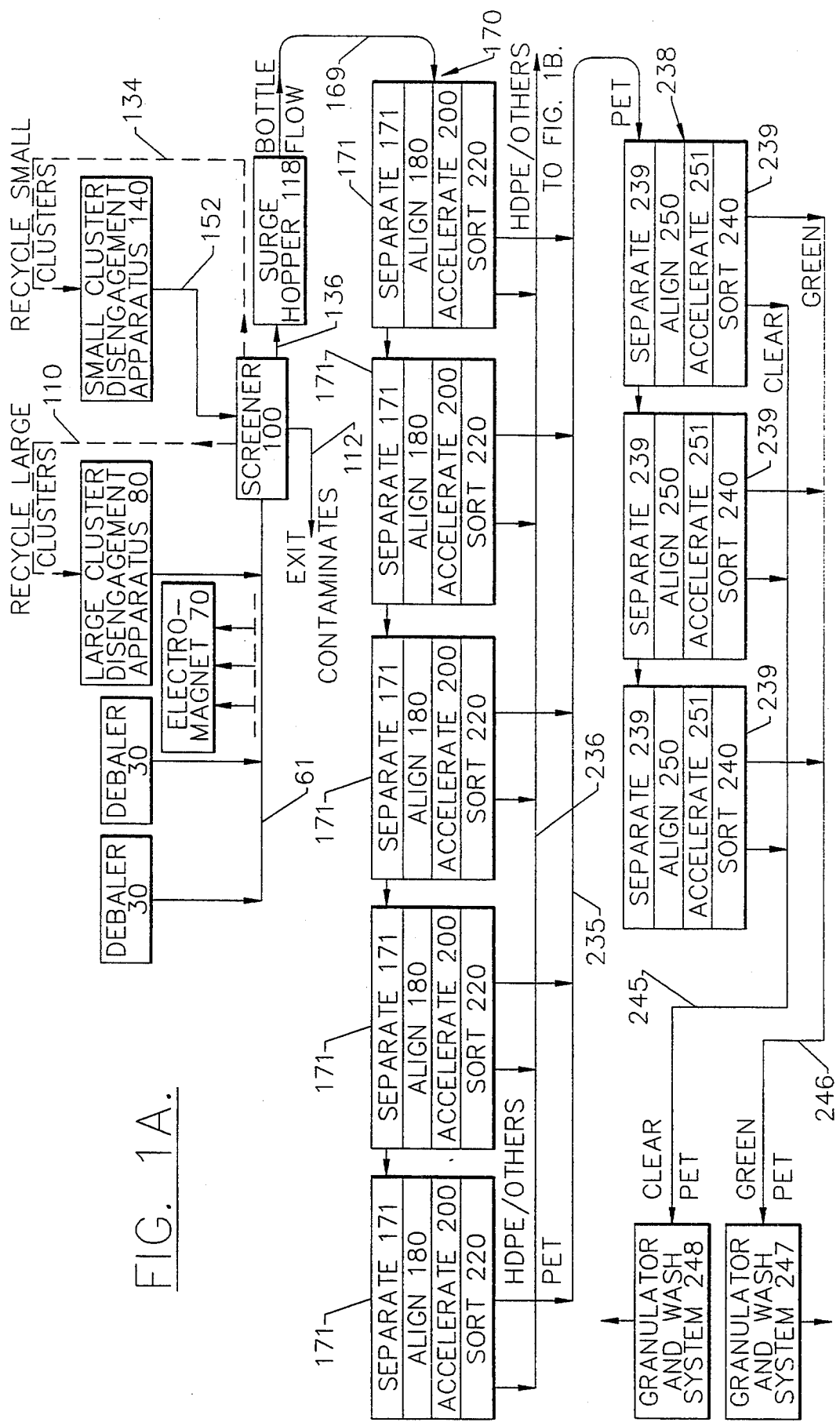

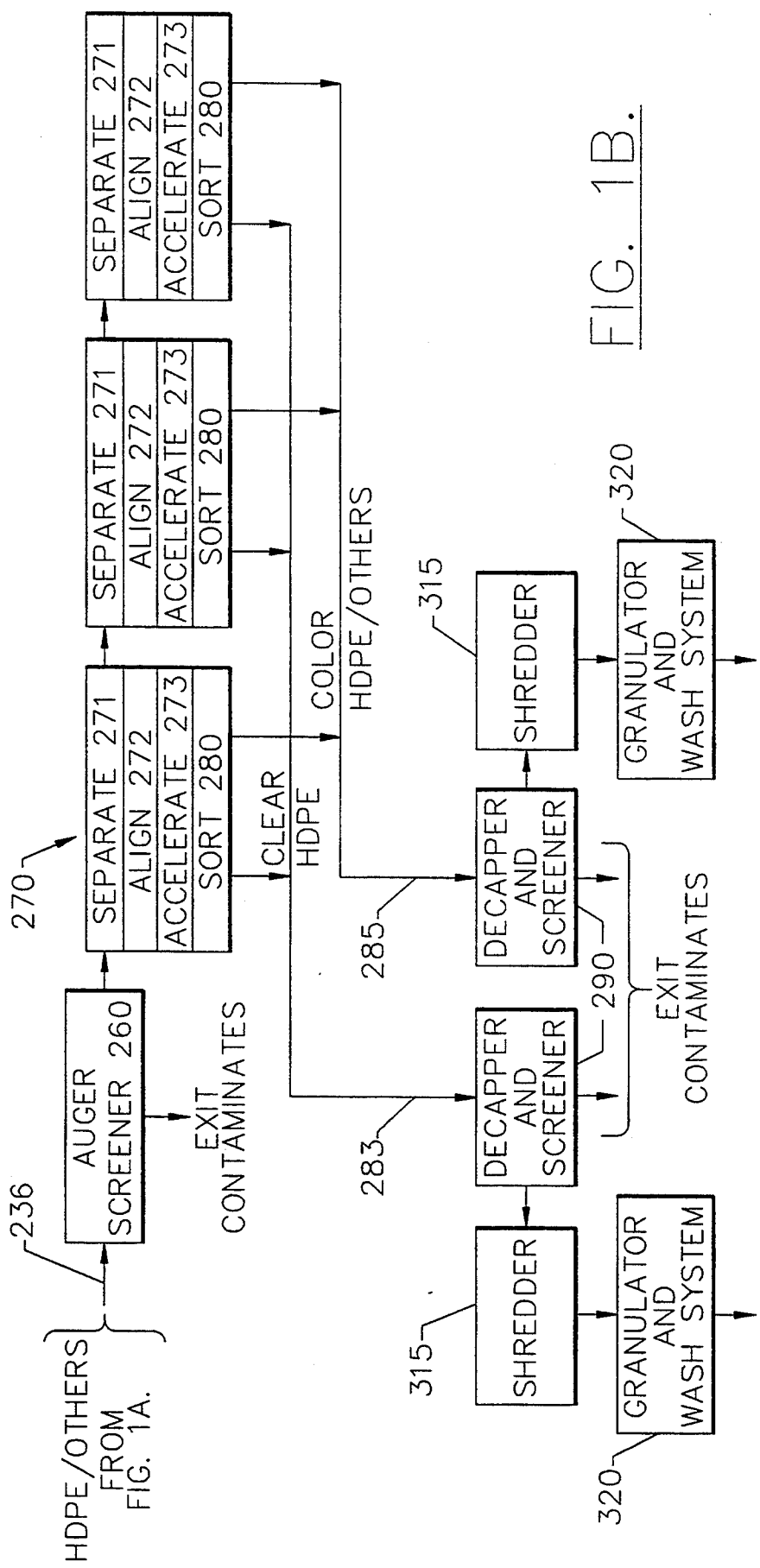

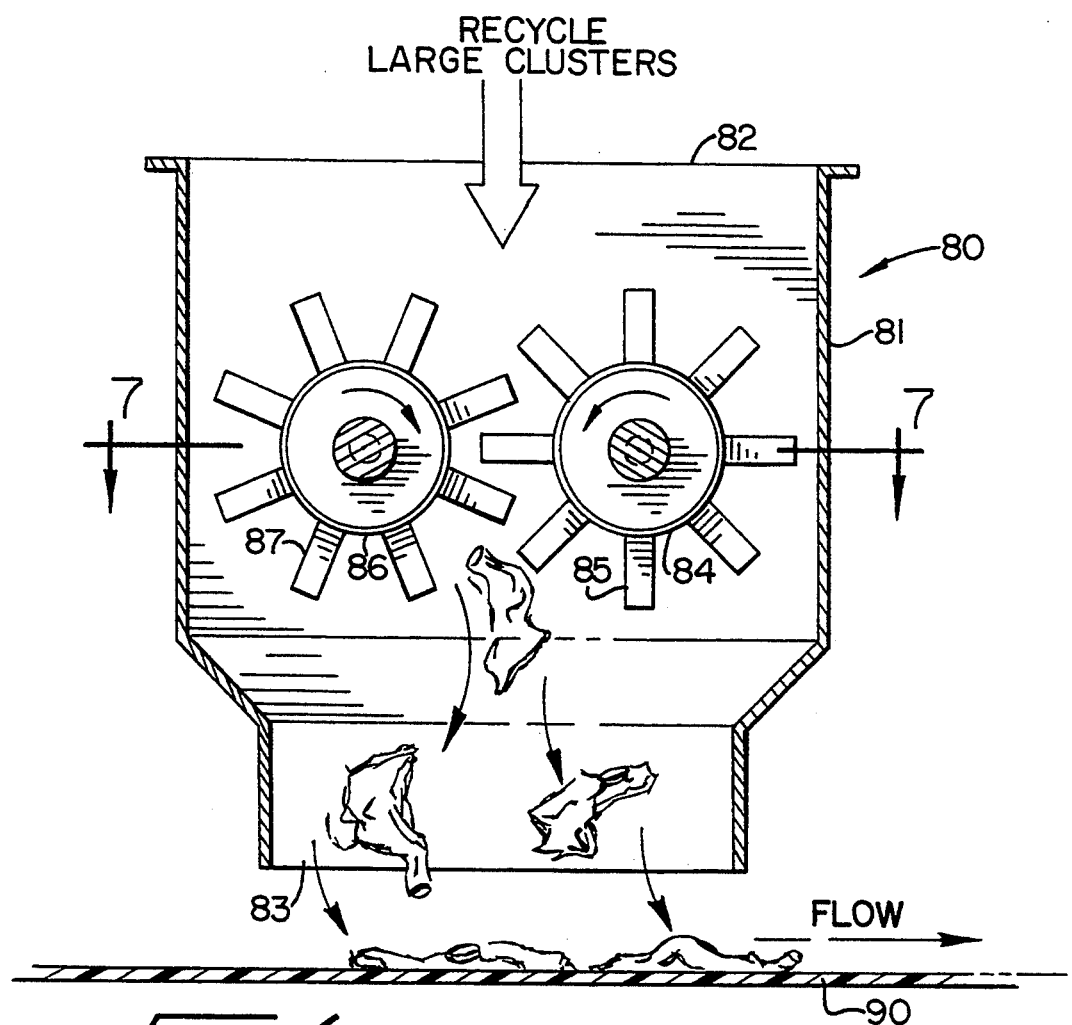
_fig. 6._
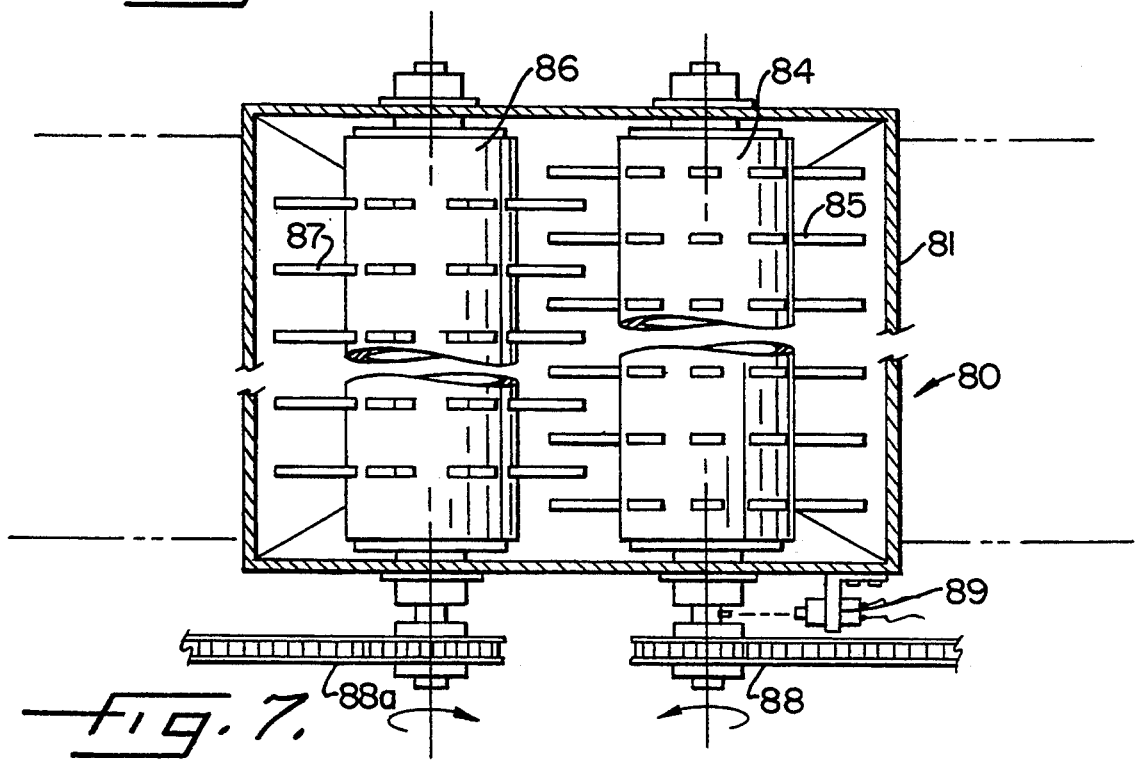
_fig. 7._

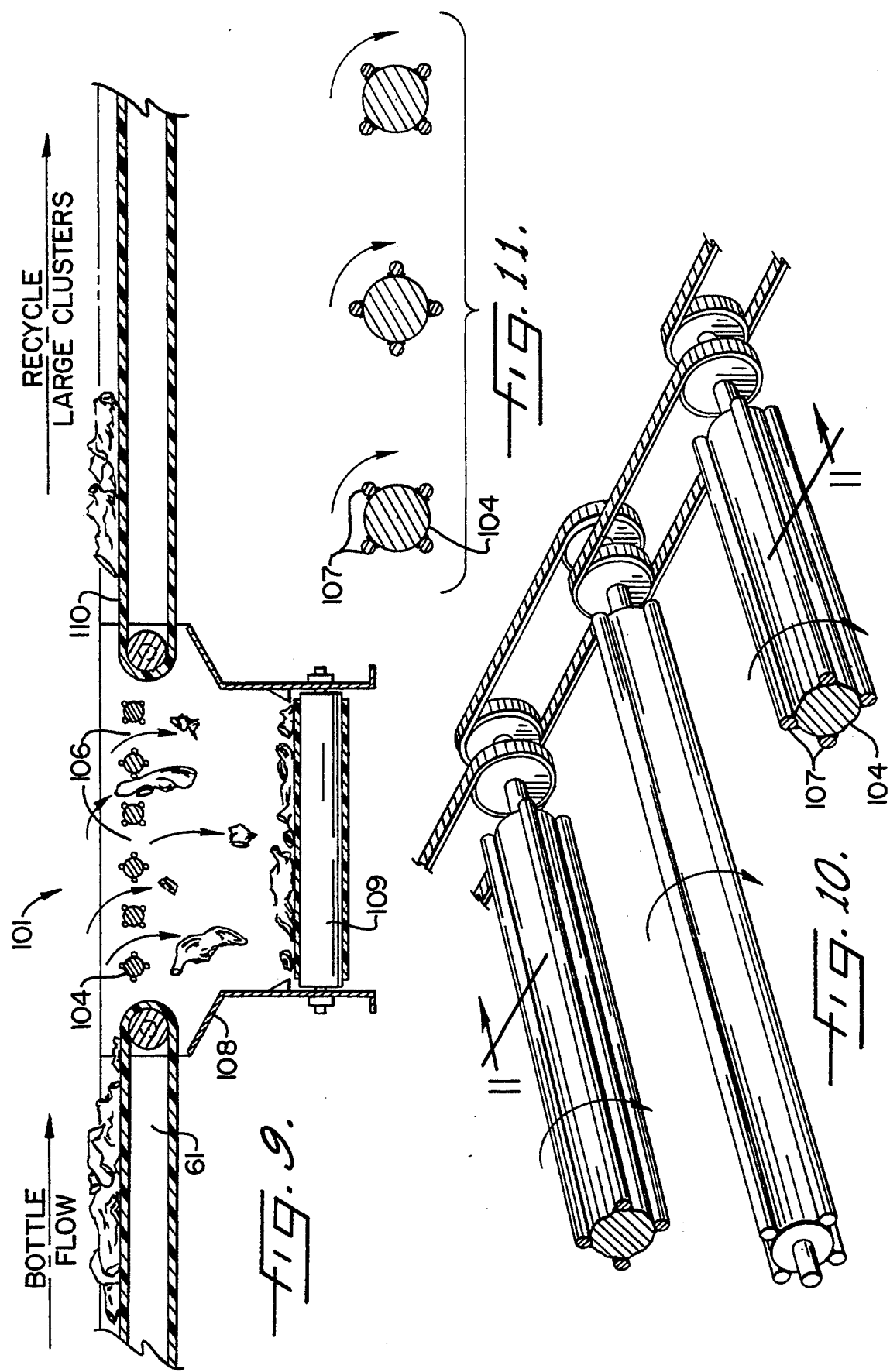

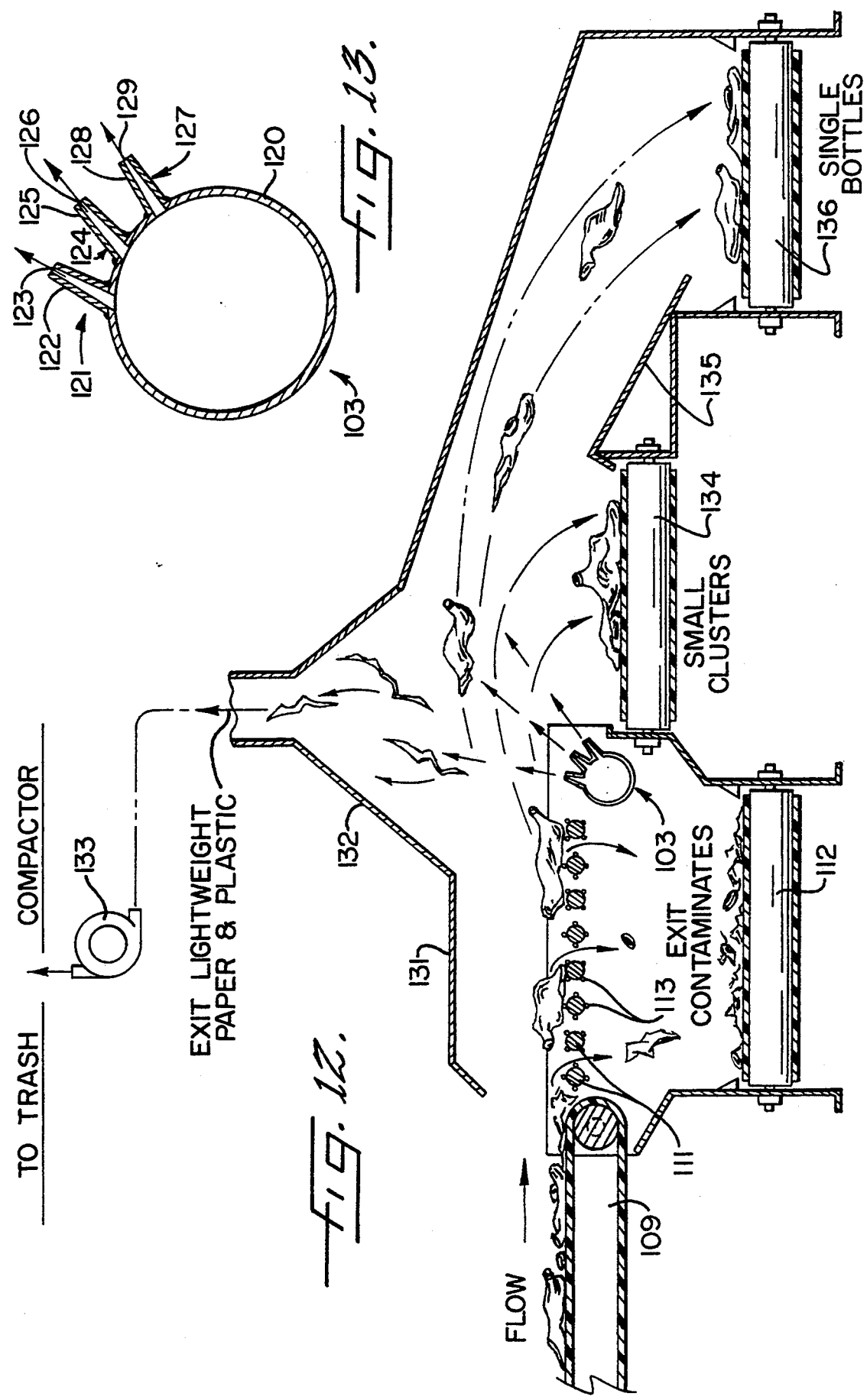

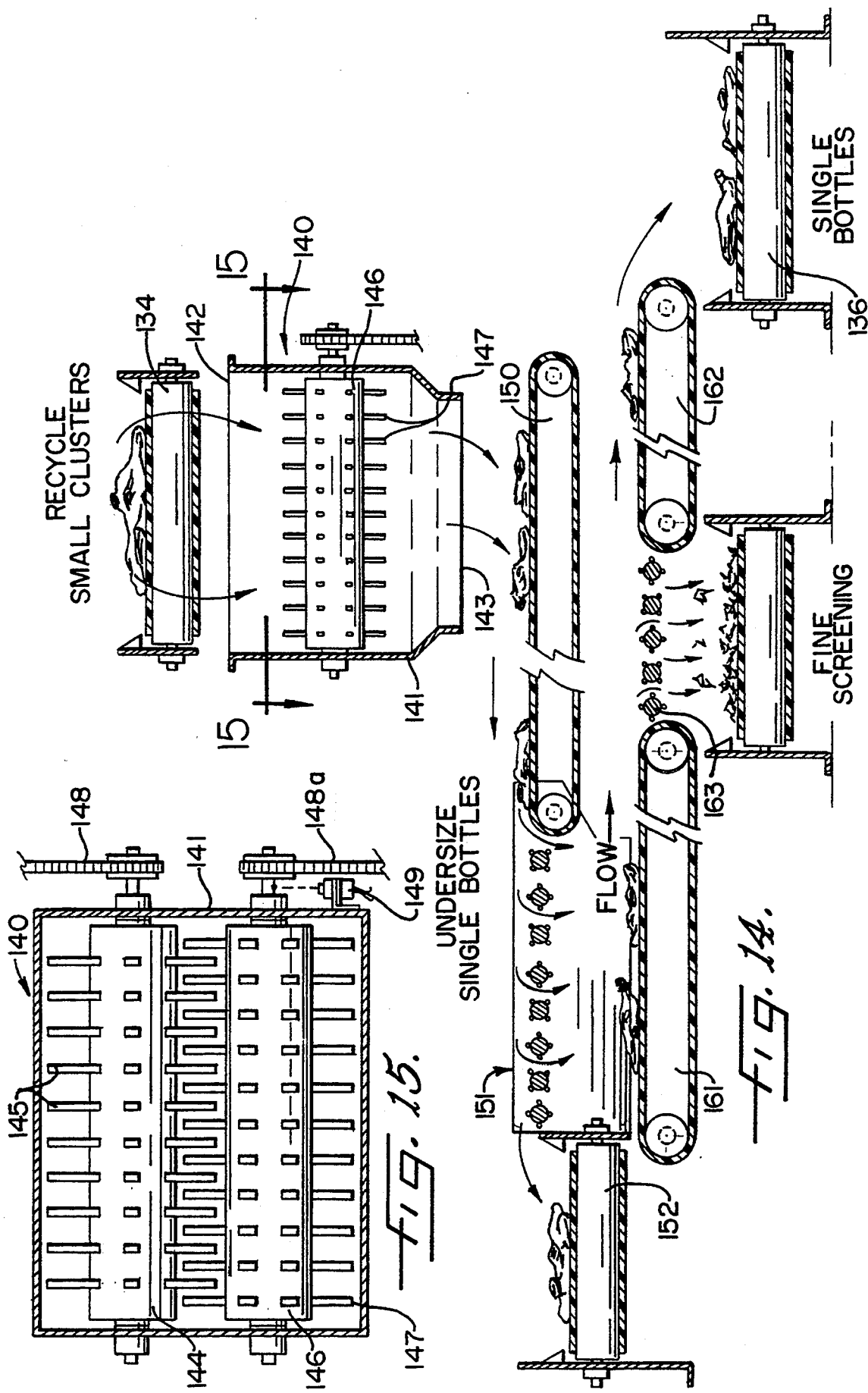

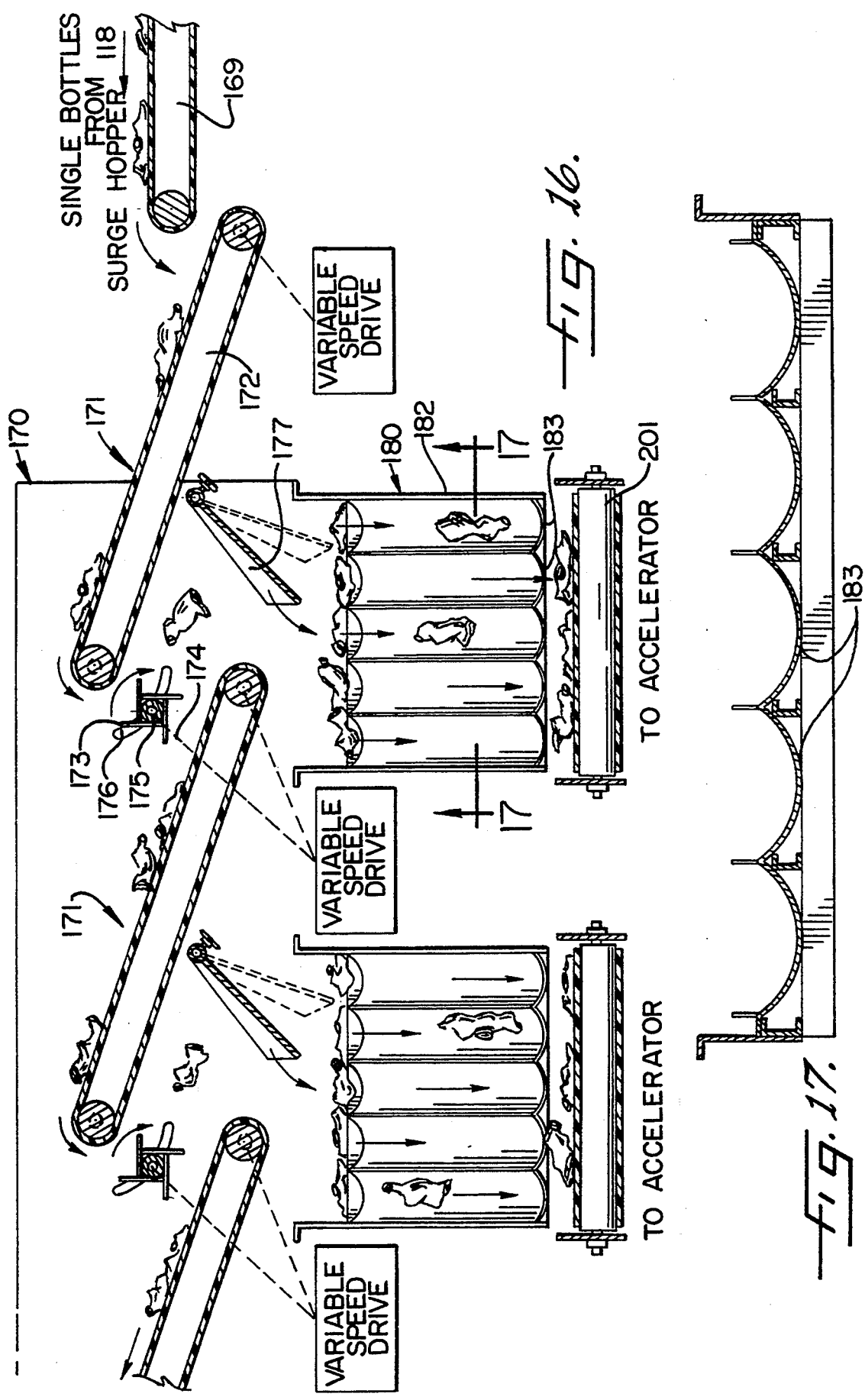

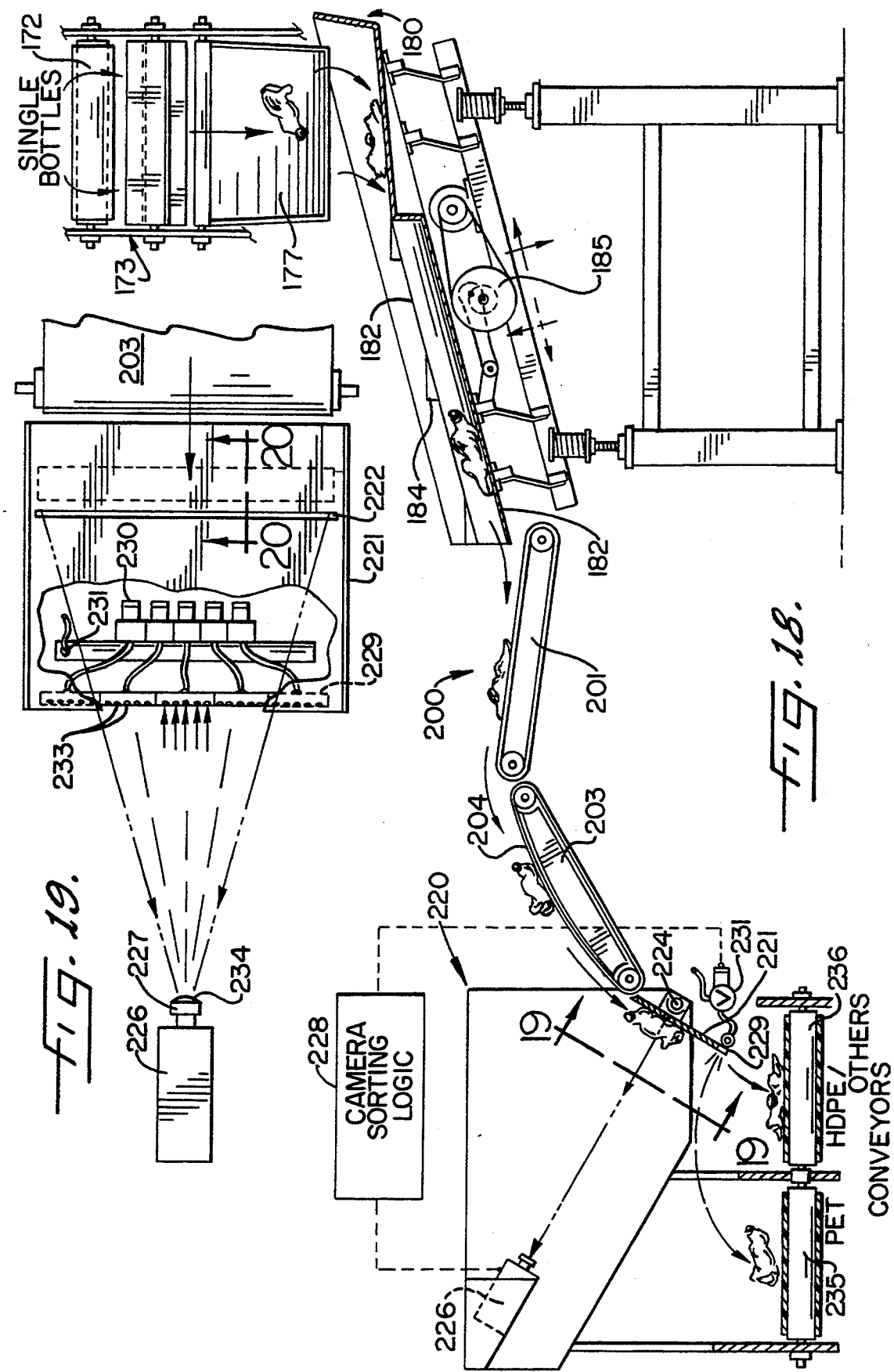

CONVEYOR SYSTEM

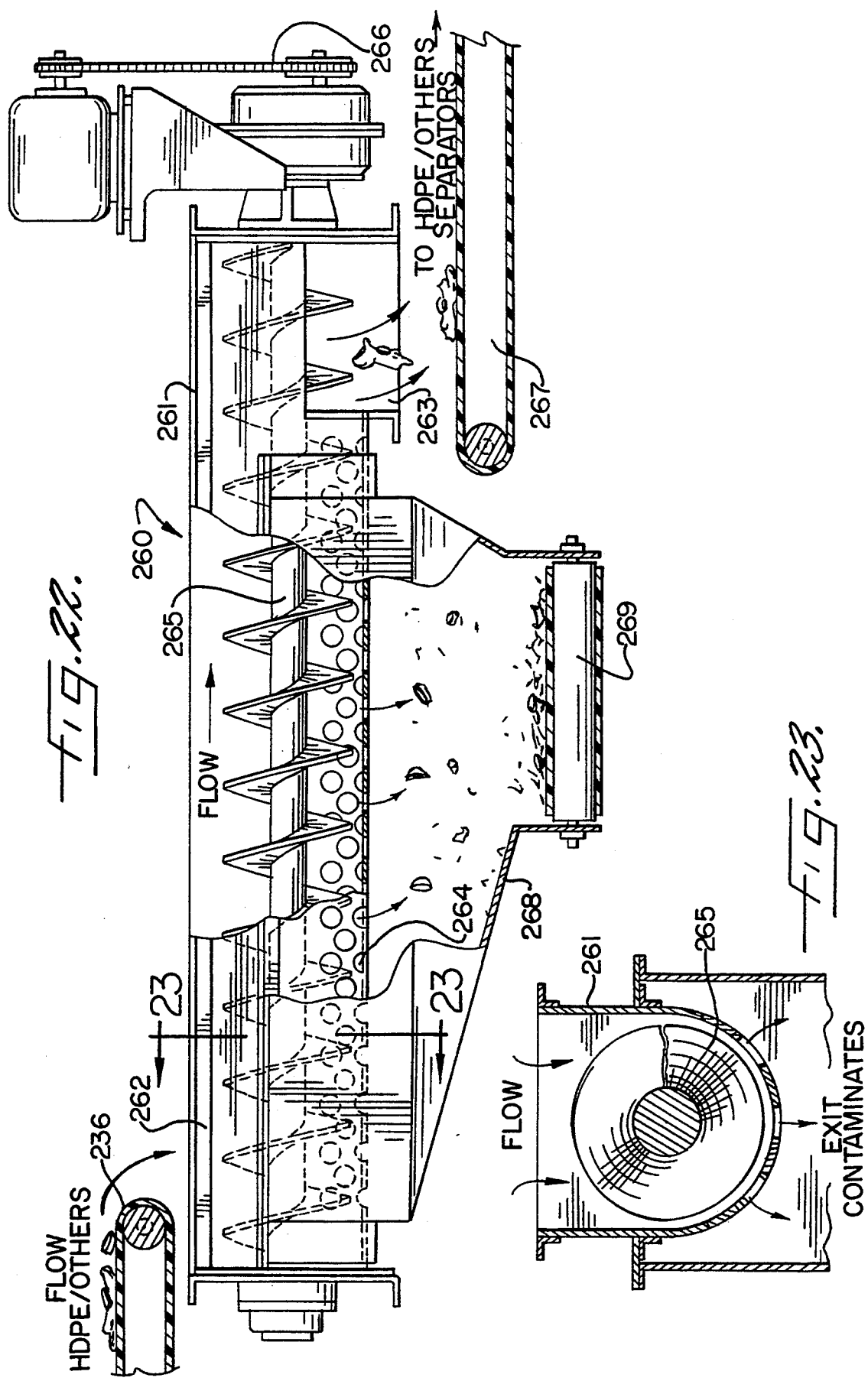

METHOD AND APPARATUS FOR SORTING PLASTIC ITEMS

RELATED APPLICATIONS

This application is a continuation-in-part of U.S. patent application Ser. No. 07/669,043, filed Mar. 14, 1991, now abandoned and titled "SORTING OPTICALLY DIFFERENT SOLID MASSES."

FIELD OF INVENTION

This invention relates to the recycling of plastic materials, and more particularly relates to the sorting of a mixture of plastic bottles of different materials into fractions for reprocessing wherein each fraction contains bottles of the same material.

BACKGROUND OF THE INVENTION

Within the last several years, public interest in the recycling of plastics has grown significantly. The primary reason for the increased public awareness is the non-biodegradable nature of many plastics; i.e., the chemical stability of plastics that makes their use in products attractive also prevents their decomposition in landfills after use. As such, the public is demanding that these plastic products be recycled into new products rather than being transported to and dumped in a landfill.

A primary difficulty in recycling plastics is that, for a collection of recovered plastic items to be recyclable and therefore valuable, the plastic items must be sorted into smaller collections wherein all items of the fraction are made of the same generic material; only then can they be reground into a form useful in making new products. Generally, the resident or business that discards plastic items probably lacks the expertise to sort the items by material type, nor can the waste collector be expected to be sufficiently knowledgeable to do so. As a result, this sorting is typically performed by hand by those with sufficient experience to recognize different plastics, but this process is extremely labor-intensive and for that reason undesirable, impractical, or even impossible for large amounts of waste plastic.

Plastic bottles are a prolific source of plastic waste, and thus are a primary target for recycling. Plastic bottles are used as containers for such products as carbonated beverages, the bottles for which generally are made of polyethylene terephthalate (PET), milk and household cleaning products, which are bottled predominantly in high density polyethylene (HDPE), and other household goods, which are bottled with polyvinyl chloride (PVC), polypropylene (PP), polycarbonate (PC) and polystyrene (PS). PET bottles often include a colored HDPE basecup, which also must be separated somehow. Bottles of all of these plastic materials generally are collected from the end users as a group, either by a household or by a waste collector, and delivered to a reprocessor in bales. The bales will often contain not only single bottles, but interlocked clusters of bottles that become intertwined as they are crushed during the baling process. To effectively separate all of the bottles in such a group so that the fractions resulting from separation are useful in recycling, and based on current uses of plastics, the mixture should preferably be separated into five fractions: clear PET, green PET, clear HDPE, colored HDPE, and other plastics. It is of particular interest to remove all PVC bottles from PET bottles, as these materials cannot be separated by density, and because a small percentage of PVC in a sample of ground PET will contaminate that sample. The prior art fails to disclose a method of accurately sorting a collection of bottles automatically, or an apparatus designed to perform the sortation.

Accordingly, a first object of the present invention is to provide a method for separating a mixture of individual plastic items wherein each individual item of the mixture is predominately made of a single plastic material, but different individual items are made of different plastic materials, into fractions, each of which contains a single material.

A second object of the present invention is to provide an apparatus for performing the separation.

It is a more particular object to provide a method for separating a mixture of individual plastic bottles into fractions of individual bottles made of the same plastic material. A further object is to provide an apparatus for carrying out the separation method.

The existence of such a separation method in turn raises the need for a method and apparatus to produce a stream of single bottles suitable for separation from the typical bale of crushed bottles. Accordingly, it is a further object of this invention to provide such a method and apparatus.

SUMMARY OF THE INVENTION

In satisfaction of these objects, a first aspect of the present invention is a method for separating a mixture of plastic items wherein each of the individual items of the mixture is made predominantly of a single material, but different individual items are made of different materials. This object is met by first measuring at a detector the effect that an individual item in a stream of items has on light directed at the item from a light source opposed to the detector, then selectively removing individual items from the stream based on a comparison of the light produced by the source and any light received at the detector. A preferred embodiment of the invention includes directing the light through a polarizing filter prior to directing it through an item and detecting the light through a second polarizing filter oriented perpendicularly to the first filter. In this embodiment, the detector detects no light unless the material of an item rotates the light sufficiently to allow detection. The light can also be directed through a colorizing filter prior to being directed through the item and measured through a second colorizing filter; the filter aids in distinguishing colored bottles from clear bottles.

In a more particularly preferred embodiment, the plastic items being separated are plastic bottles, and the effect measured is the amount of light rotated by the plastic material of the bottles that is transmitted to the detector. Each of the bottle fractions created by the selective removal of bottles from a stream of bottles can then be sorted in the same manner until the mixture has been fully sorted into fractions containing bottles all made of the same plastic material. In a typical embodiment, the mixture of plastic bottles comprises clear and green PET bottles, clear and colored HDPE bottles, PVC bottles, PC bottles, PS bottles, and PP bottles.

A second aspect of the invention is an apparatus suitable for carrying out the separation method described above. The apparatus comprises a light source for emitting light of a predetermined character, a detector opposed to the light for measuring the effect that an individual item within a stream of items directed between the source and the detector has on light emitted by the source, and sortation means responsive to the detector for removing individual items from the stream based on a comparison of the light produced by the source and any light detected by the detector. In a preferred embodiment, the light source further comprises a first polarizer located between the light source and the stream of items, and a second polarizer located between the stream of items and the detector that is oriented perpendicularly to the first polarizer. In this arrangement, light fails to reach the detector unless individual item rotates the light; thus detection of light indicates the presence of an item to be sorted. Another preferred embodiment of the invention includes colorizing filters through which the light must pass prior to and after passing through the item. This embodiment allows the sortation of clear plastic items from translucent items of the same color as the filter.

Another aspect of the invention is an apparatus for separating single plastic bottles from a mixture of single plastic bottles, small interlocked bottle clusters, large interlocked bottle clusters, and undersized items in preparation for sortation as described above. The apparatus comprises a first screening means for separating large interlocked clusters, a second screening means for separating undersized items, and means for directing an air jet against a bottle or small interlocked bottle cluster which is sufficiently forceful to displace a single bottle to a collection means, but insufficiently forceful to displace a small interlocked bottle cluster to the collection means. In a preferred embodiment, the apparatus also comprises a debaler which disengages individual bottles formed into a bale, magnetic means for removing metal items, and vacuum means for removing loose paper items, plastic bags, and the like from the mixture.

A further aspect of the invention is an apparatus for removing the caps which remain attached to HDPE bottles. The apparatus comprises a chamber having an inner wall, a stationary blade attached to the housing inner wall, a movable striking blade, and means for moving the striking blade past the stationary blade in such a manner that the striking edge of the striking blade moves to a position in which the striking edge is substantially parallel to and in adjacent but noncontacting relation with the outer edge of the stationary blade. In a preferred embodiment, the means for moving the striking blade rotate the striking blade.

An additional aspect of the invention is an apparatus for disengaging interlocked bottle clusters to produce single bottles. The apparatus comprises a housing, a first movable support for mechanical fingers, a first plurality of mechanical fingers attached to the first movable support, a second movable support for mechanical fingers, a second plurality of mechanical fingers attached to the second movable support, and means for moving the first and second movable supports such that the striking ends of the sets of pins intermesh but do not contact each other. In a preferred embodiment, the movable supports rotate the fingers in opposite angular directions.

BRIEF DESCRIPTION OF THE DRAWINGS

FIGS. 1B and 1A provide a schematic overview of the steps involved in separating and sorting a mixture of plastic bottles.

FIG. 6 is a cross-sectional side view of the large cluster disengaging apparatus.

FIG. 7 is a cross-sectional view of the large cluster disengaging apparatus taken along lines 7—7 of FIG. 6.

FIG. 9 is a side view of the first roller conveyor taken along lines 9—9 of FIG. 8.

FIG. 10 is a perspective view of three typical rollers found in the first roller conveyor and second roller conveyor.

FIG. 11 is an end view of three typical rollers of a roller conveyor comprising friction rods taken along lines 11—11 of FIG. 10.

FIG. 12 is a cross-sectional side view of the second roller conveyor and the trajectory modifier taken along lines 12—12 of FIG. 8.

FIG. 13 is a cross sectional side view of the trajectory modifier.

FIG. 14 is a cross-sectional view of the small cluster disengaging apparatus and the small cluster roller conveyer taken along lines 14—14 of FIG. 8.

FIG. 15 is a cross-sectional view of the small cluster disengaging apparatus taken along lines 15—15 of FIG. 14.

FIG. 16 is a front view of two representative subunits of the HDPE/PET separator unit.

FIG. 17 is a cross-sectional view of the lower section of a vibrating conveyor taken along lines 17—17 of FIG. 16.

FIG. 18 is a side view of a representative positioning unit comprising a vibrating conveyor, an upwardly inclined acceleration belt conveyor, and a radial conveyor, and a representative sorter.

FIG. 19 is a view of a representative slide plate and a cutaway view of a representative series of air jets taken along lines 19—19 of FIG. 18.

FIG. 22 is a cutaway side view of the HDPE/PVC screening auger conveyor.

FIG. 23 is a cross-sectional view of the HDPE/PVC screening auger conveyor taken along lines 23—23 FIG. 22.

DETAILED DESCRIPTION OF THE INVENTION

Figure 2:
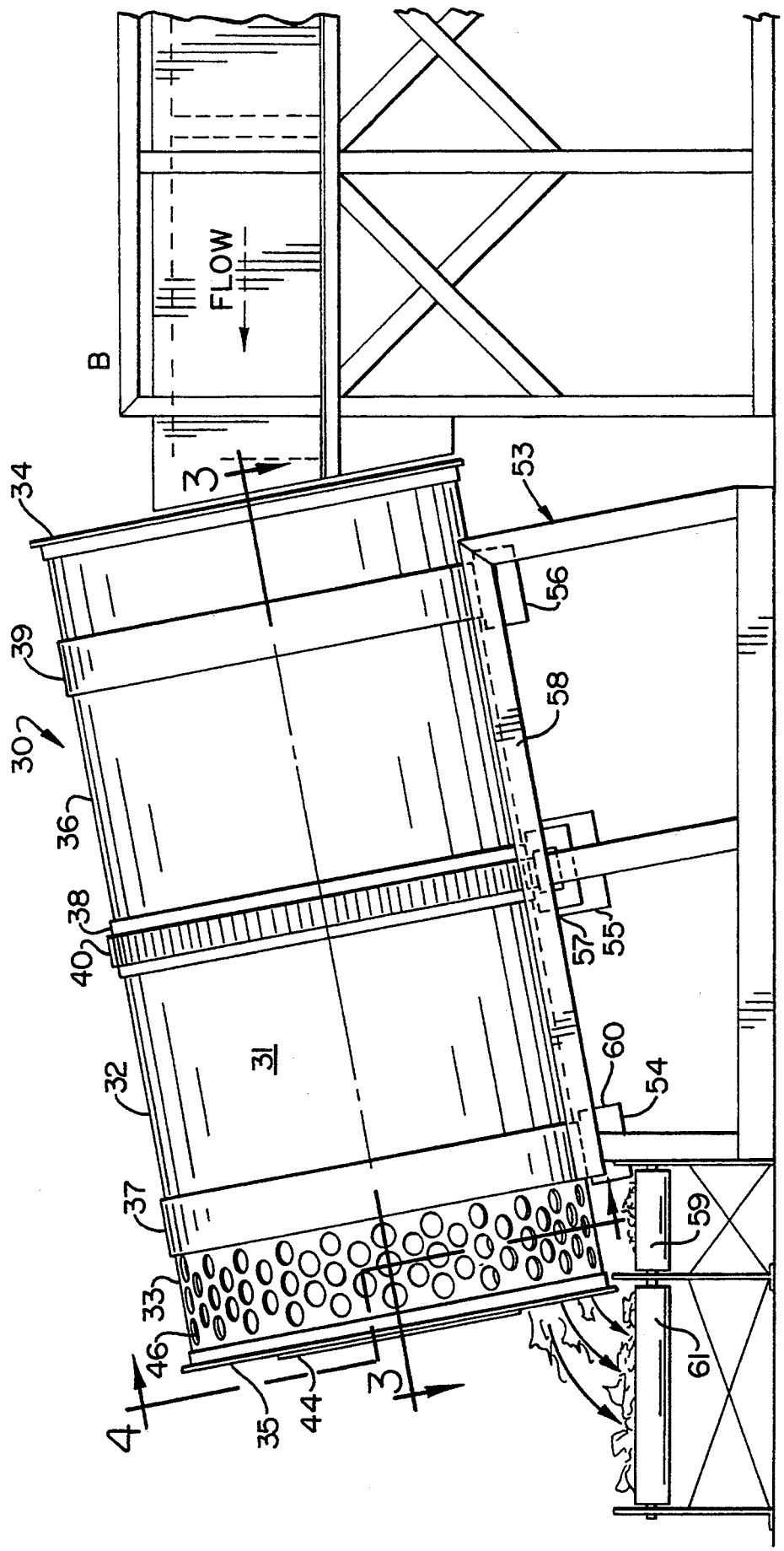
FIG. 2 is a side elevational view of the debaler.

The present invention includes a method for sorting a mixture of plastic items wherein each individual plastic item is made predominantly of a single material, but different plastic items are made of different materials. The method comprises measuring the effect that each individual item has on light of a predetermined character directed at the item from a light source and measured at a detector opposed to the source as a stream of the items is successively directed past the source and the detector, and selectively removing individual items from the stream based upon a comparison of the light produced by the source and any light received at the detector. The method depends on the fact that each plastic material has an inherent characteristic effect on light that differs from other plastic materials. By measuring the effect an item has on light of a predetermined character and comparing that light to light emitted by the light source, the detector can distinguish different materials and thus signal the sortation means to either remove the item from the initial stream to a second stream or allow it to remain with the original stream.

In a presently preferred embodiment, the effect measured is that of the rotation of polarized light by an item. In general, plastic materials have inherent amorphous/crystalline ratios and crystalline structures unique to each material. The crystalline structure and percentage of material in crystalline form in a particular plastic affect the degree to which the plastic rotates polarized light. This rotation can be easily detected by directing light from the source through a polarizer prior to directing it at the item to be examined and by detecting the light through a second polarizer oriented perpendicularly to the first polarizer. The relative orientation of the first and second polarizers prevents light from reaching the detector unless an item rotates the light, thereby indicating to the sortation means that a light-rotating item is present. The quantity of light detected at the detector depends on the transmissivity of the item, so that a greater quantity of light will be detected when an item made of a material having a high transmissivity is examined than when an item made of a material which transmits little or no rotation is detected. Thus by knowing the most likely group of plastic materials that make up a mixture of plastic items, a series of sortations can be designed wherein each sortation step removes items from its stream upon the detection of a certain quantity of light which distinguishes the materials desired to be sorted by that step. The initial stream can be fractionated again and again into smaller streams until all items have been sorted into fractions containing items of only a single material.

An apparatus for carrying out the method described above comprises a light source for emitting light of a predetermined character, a detector opposed to the light source for measuring the effect that each individual item has on the light as the stream of bottles is directed between the light source and the detector, and sortation means for selectively removing individual bottles from the stream based on a comparison of the light emitted by the source and any light detected by the detector. The light source can be any source capable of emitting light of predetermined character. In a preferred embodiment of the invention the light source further comprises a first polarizing filter mounted between the light source and the stream of items which rotates light prior to its being directed at an individual item. The detector can be any type of detection means that is suitable for determining the effect that an item has on light of a predetermined character. These are well-known by those of ordinary skill in this art and can be selected without undue experimentation. Preferably, the detector is suitable for determining whether an item has rotated light directed at it. A preferred embodiment further comprises a second polarizing filter oriented perpendicularly to the source's polarizing filter through which the second filter detector detects the light. As a result of this polarizer's relative orientation, no light emitted by the source reaches the detector unless the light has been rotated by an item as the item passes between the light source and the detector. If a certain quantity of light reaches the detector, the detector signals the sortation means to remove that item from the stream. The sortation means can be any means responsive to the detector suitable for removing an item from a stream, such as mechanical paddles, a hydraulic jet, or an air jet. In the present embodiment, an air jet is preferred.

The present invention will now be described more particularly hereinafter with reference to the accompanying drawings, in which a preferred embodiment of the invention is shown. The invention can, however, be embodied in many different forms and should not be construed as limited to the embodiment set forth herein; rather, applicants provide this embodiment so that this disclosure will be thorough and complete, and will fully convey the scope of the invention to those skilled in the art.

FIGS. 1 and 2 illustrate through a schematic flow chart an overview of the material flow in sorting plastic bottles, which is a presently preferred embodiment of the invention. The bottles arrive at the plant site in bales which typically predominantly comprise plastic bottles but which also include metal caps, paper, plastic labels, dirt, and the like which are unavoidably included during bottle collection. Usually the overwhelming majority of plastic bottles included in the bale are a mixture of green PET bottles, clear PET bottles, clear HDPE bottles, and colored HDPE bottles, with the remainder generally comprising PVC bottles, PC bottles, PS bottles and PP bottles. These remaining bottles will be referred to herein as "other bottles". Most are individual bottles, but during the baling process some bottles are crushed in such a way that they form interlocked bottle clusters. As would be expected, the presence of clusters is undesirable for sorting because they often will include therein bottles made of different materials. As used herein, the term "large interlocked bottle clusters" represents clusters that are significantly larger in size than an individual bottle, and the term "small interlocked bottle cluster" represents clusters that are similar in size to an individual bottle.

As shown in FIGS. 1 and 2, the bottles pass through a debaler 30 which tumbles the bale to separate its components and form them into a stream of individual items. These items are conveyed beneath an electromagnetic unit 70 which attracts and thus removes metal objects, which predominantly comprise steel caps and wire, from the stream. The items then travel on a belt conveyor 61 to a single bottle screening unit 100 comprising a first screener which removes large interlocked bottle clusters from the stream, a second screener which removes undersized items, and a trajectory modifier which separates the single bottles from small interlocked bottle clusters. The small interlocked clusters and large interlocked clusters are conveyed to means for disengaging the individual bottles and then are conveyed back into the stream of single bottles.

In the preferred embodiment, the stream of single PET, HDPE and other bottles is divided by a PET/HDPE separator 170 into five substantially equal fractions; although preferred for processing ease, the step is theoretically unnecessary to the practice of the invention. Each fraction enters an accompanying PET/HDPE positioning unit, wherein individual bottles are preferably oriented and distanced from each other. They then travel to an PET/HDPE sorter 220, wherein the fraction is separated by the method described above into one fraction containing PET bottles and a second fraction containing HDPE and other bottles.

The PET fractions emerging from the PET/HDPE sorters are combined into a single PET stream on a conveyor 235 which conveys them to a PET separator 238, which divides the stream into three substantially equal PET fractions. Each of these is conveyed successively to a PET positioning unit and a PET sorter 240, wherein green PET bottles are separated from clear PET bottles using the sorting method described herein. The green PET fractions exiting the PET sorters are combined into a green PET stream; similarly, the clear PET fractions are combined into a clear PET stream. Each of these streams is conveyed to its respective granulator and wash systems for final processing.

Concurrently, the fractions containing HDPE and other bottles emerge from the sorters and are combined to form a single stream. This stream is conveyed through a screening auger conveyor 2CO to remove unwanted small items which were not screened earlier or which were created in the first sorting step, such as bottle fragments. Next, the stream is divided into three substantially equal fractions in an HDPE separator 270. Each HDPE fraction is then successively conveyed to an HDPE positioning unit and HDPE sorter 280, wherein each fraction is sorted into a clear HDPE fraction and a fraction containing colored HDPE and other bottles. The clear HDPE fractions and colored HDPE fractions emerging from the HDPE sorters are combined with their identical fractions emerging from the other sorters, then are conveyed to decappers 290. Many HDPE have plastic caps which remain attached to the bottles after disposal. The decappers remove these caps by striking the bottles with rotating blades with sufficient force to disengage the caps. The capless bottles are then conveyed to their respective shredders and granulation/wash systems.

Figure 3:
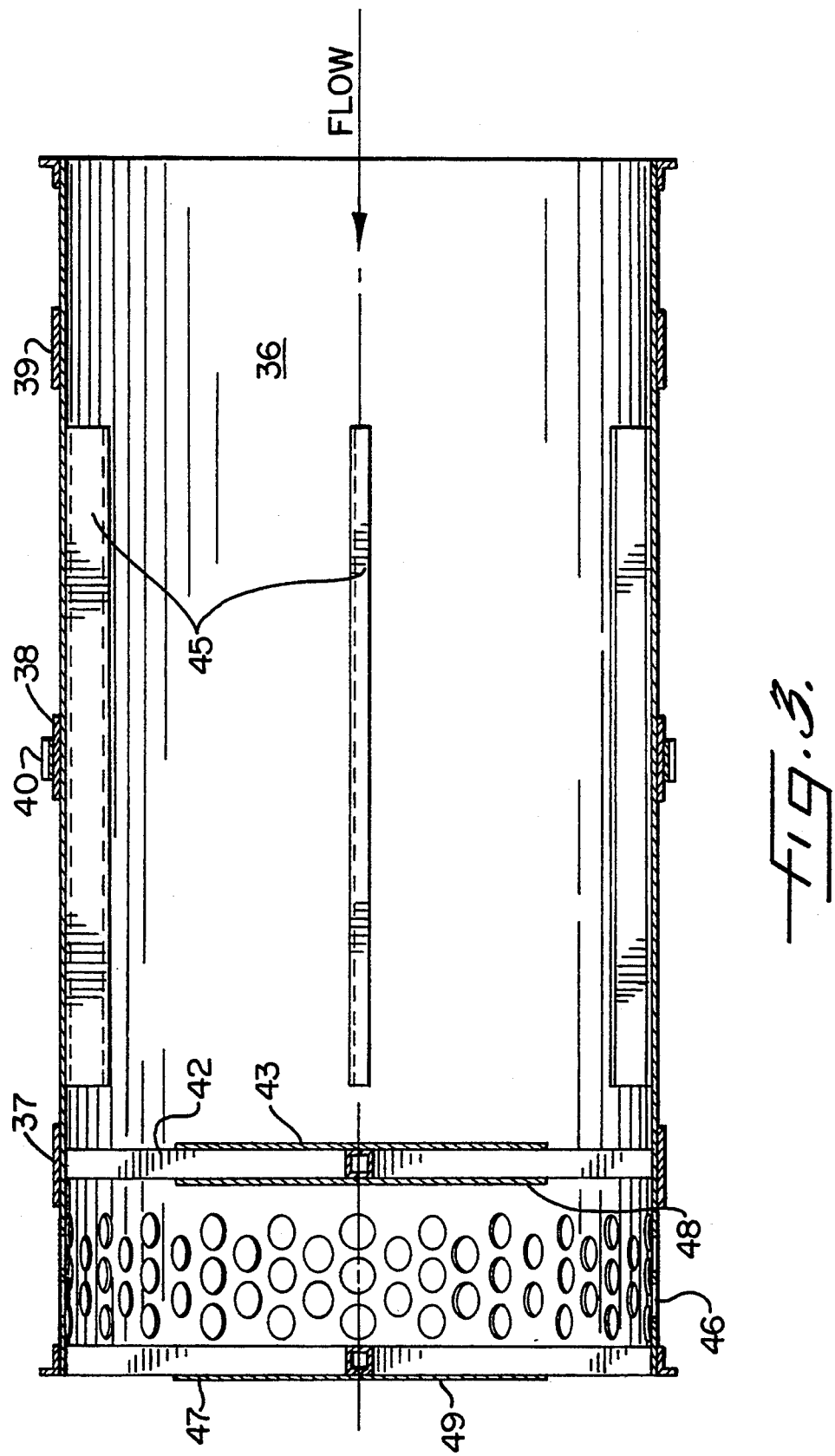
FIG. 3 is a cross-sectional view of the debaler housing taken along lines 3—3 of FIG. 2.
Figure 4:
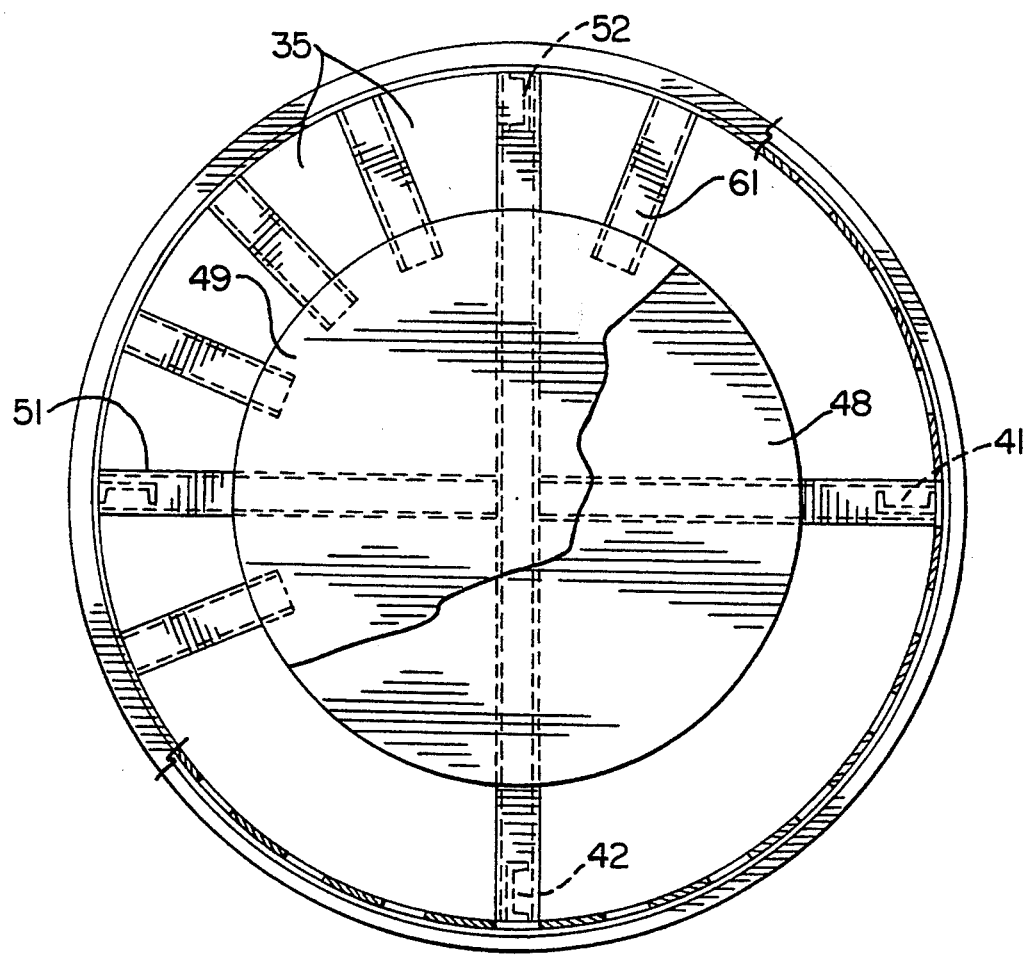
FIG. 4 is a downstream end view of the debaler housing and flow control plates taken along lines 4—4 of FIG. 2.
Figure 5:
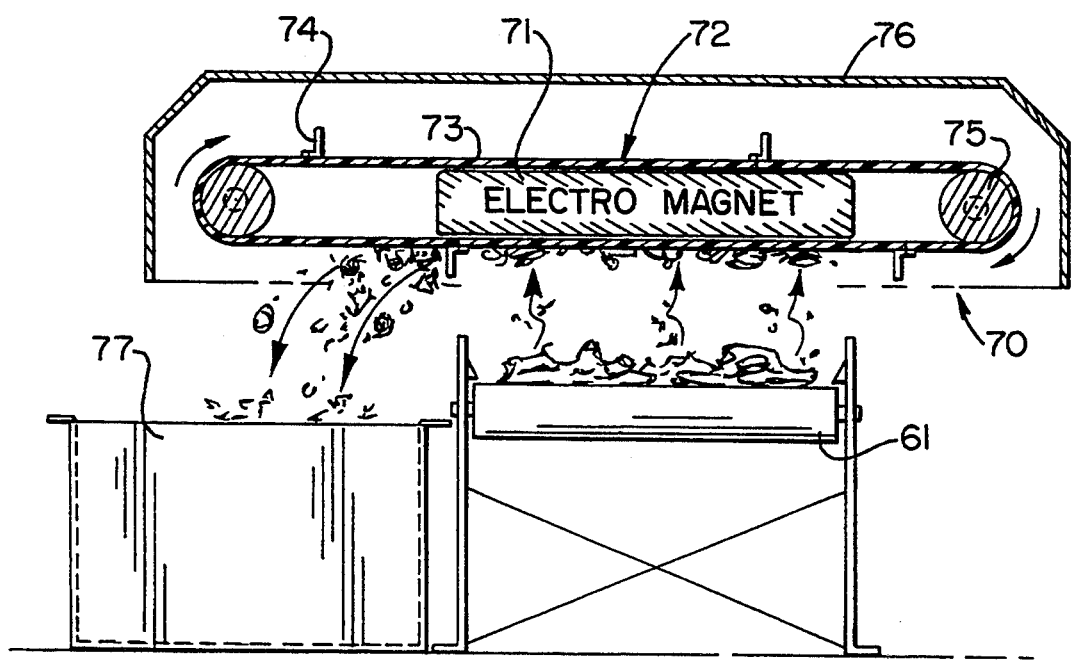
FIG. 5 is a side view of the electromagnet and cleated conveyor belt which removes metallic items from the stream.

The debaler, broadly illustrated at 30 in FIGS. 2-4, disengages the contents of a bale B to produce single bottles, interlocked bottle clusters, and other debris incident to the collection and baling of bottles. The debaler 30 comprises a cylindrical housing 31, a debaler support frame broadly designated at 53, and a drive motor 60.

The support frame 53 comprises frame support members 58 and three rollers 54, 55, 56 for rotating housing 31. The center roller 55 further comprises a groove 57 for restraining lateral movement of the housing 31. The drive motor 60 is attached to the support frame 53 and is operatively connected to the downstreammost roller 54 to rotate the housing 31.

The housing 31 rests on the debaler support frame 53 inclinedly downward from upstream to downstream to facilitate travel of the bottles through the debaler 30. The housing 31 comprises an upstream solid section 32, a downstream perforated section 33, an entrance opening 34, and a plurality of exit openings 35. The solid section 32 has a cylindrical solid wall 36 which extends longitudinally the length of the solid section 31. Four tumbling bars 45 (FIG. 3) attached to the inner surface of the solid section 32 and spaced circumferentially equally about the inner surface of the solid wall 36 extend radially inwardly and longitudinally along the inner wall parallel to the longitudinal axis of the housing 31. Three circular rotation bands 37, 38, 39 are attached to the outer surface of the solid wall 36 to provide a contact surface for the rollers 54, 55, 56. The center rotation band 38 further comprises a restraining strip 40 which fits within a groove 57 of the center roller 55 and thereby restricts lateral movement of the housing 31. A circular flow control plate 43 (FIG. 4) is attached to the downstreammost end of the solid section 32 by twelve flow control plate support spokes (hidden by spokes 61 in FIG. 4) equally spaced circumferentially about the solid wall 36. Also attached to the wall 36 adjacent and downstream of the flow control plate 43 are two perpendicularly intersecting support beams 41, 42 which extend diametrically across the housing 31.

The perforated section 33 comprises a cylindrical perforated wall 46 having a plurality of openings 47 through which small unwanted items from the bale can pass. The openings 47 as shown are circular holes three inches in diameter but can be of any appropriate shape and size small enough to prevent passage of a bottle. A flow control plate 48 substantially identical in size and shape to the flow control plate 43 described earlier is attached to the upstreammost end of the perforated section 33 by twelve equally circumferentially spaced flow control plate support spokes 50. A second flow control plate 49 is attached to the downstreammost end of the perforated section 33 by twelve flow control plate support spokes 61. As best illustrated in FIG. 4, the spokes 61 create the plurality of exit openings 35. Diametrically extending and perpendicularly intersecting support bars 51, 52 substantially identical to the support bars 41, 42 are attached at the downstreammost end of perforated section 33.

A contaminant belt conveyor unit 59 is located beneath the perforated section 33 and serves to collect small items passing through the openings 47 and convey them to a waste receptacle. It is to be understood that this belt conveyor unit and other belt conveyors noted below are well-known by those skilled in this art. As illustrated, they comprise a semi-flexible looped belt, two rollers over which the looped belt fits, and a drive unit for rotating the rollers, which in turn drive the belt to convey whatever items rest upon the belt in a predetermined direction. The upstreammost end of the debaler-screener belt conveyor unit 61 is located beneath the downstreammost end of the housing 31 to collect items emerging from the exit openings 35 of the debaler 30 and convey them to a single bottle screener 100.

An intermediate portion of the debaler-screener belt conveyor 61 travels beneath an electromagnetic unit broadly illustrated at 70, which comprises an electromagnet 71 mounted within the periphery of a cleated belt conveyor 72, a hood 76, and a metal collection area 77. The electromagnetic unit 70 is mounted such that the direction of travel of the cleated belt conveyor 72 is perpendicular to the direction of travel of the debaler-screener belt conveyor 61. The electromagnet 71 can be any device which provides an electromagnetic attraction for ferrometallic materials. The cleated belt conveyor 72 comprises a looped belt 73, a driving unit 75 for supporting and moving the belt 73, and a plurality of cleats 74 which span the width of and extend perpendicularly to the belt 73. The cleats 74 encourage metal objects attracted by the electromagnet 71 to be conveyed to a metal collection area 77 rather than sliding on the belt 73 back towards the electromagnet 71 due to its magnetic attraction. The metal collection area 77 is located adjacent the debaler-screener belt conveyor 61 beneath the downstream end of the cleated belt conveyor 72 to collect metal items removed from the stream of items by the electromagnet 71 and conveyed away by the cleated conveyor belt 72.

The debaler-screener belt conveyor 61 leads to a single bottle screening assembly 100 (FIG. 8) which separates single bottles from the large interlocked bottle clusters, small interlocked bottle clusters, and unwanted undersized items also present in the stream. The single bottle screening assembly 100 comprises a first screening unit for removing large interlocked bottle clusters from the stream of items, a second screening unit for removing unwanted undersized items from the stream, and a trajectory modifier for separating single bottles from small interlocked bottle clusters. The first screening unit can be any means suitable for separating large interlocked bottle clusters within the stream from single bottles, small interlocked bottle clusters, and undersized items. A preferred first screening unit comprises a roller conveyor. As used herein, a roller conveyor comprises a frame having two parallel frame members, a plurality of parallel cylindrical rotatable rollers attached at either end perpendicularly to the frame members and spaced from each other such that a plurality of openings are created, and drive means for rotating the rollers about their longitudinal axes to convey items in a direction substantially perpendicular to the rollers. Such a roller conveyor is known to those skilled in this art. The second screening unit can be any means suitable for separating undersized items within the stream from single bottles and small interlocked bottles clusters; as with the first screening unit, a roller conveyor as described herein is preferred. The trajectory modifier can be any means which displaces single bottles to a collection means but does not displace small interlocked bottle clusters to the collection means. The preferred trajectory modifier is an air jet.

Figure 8:
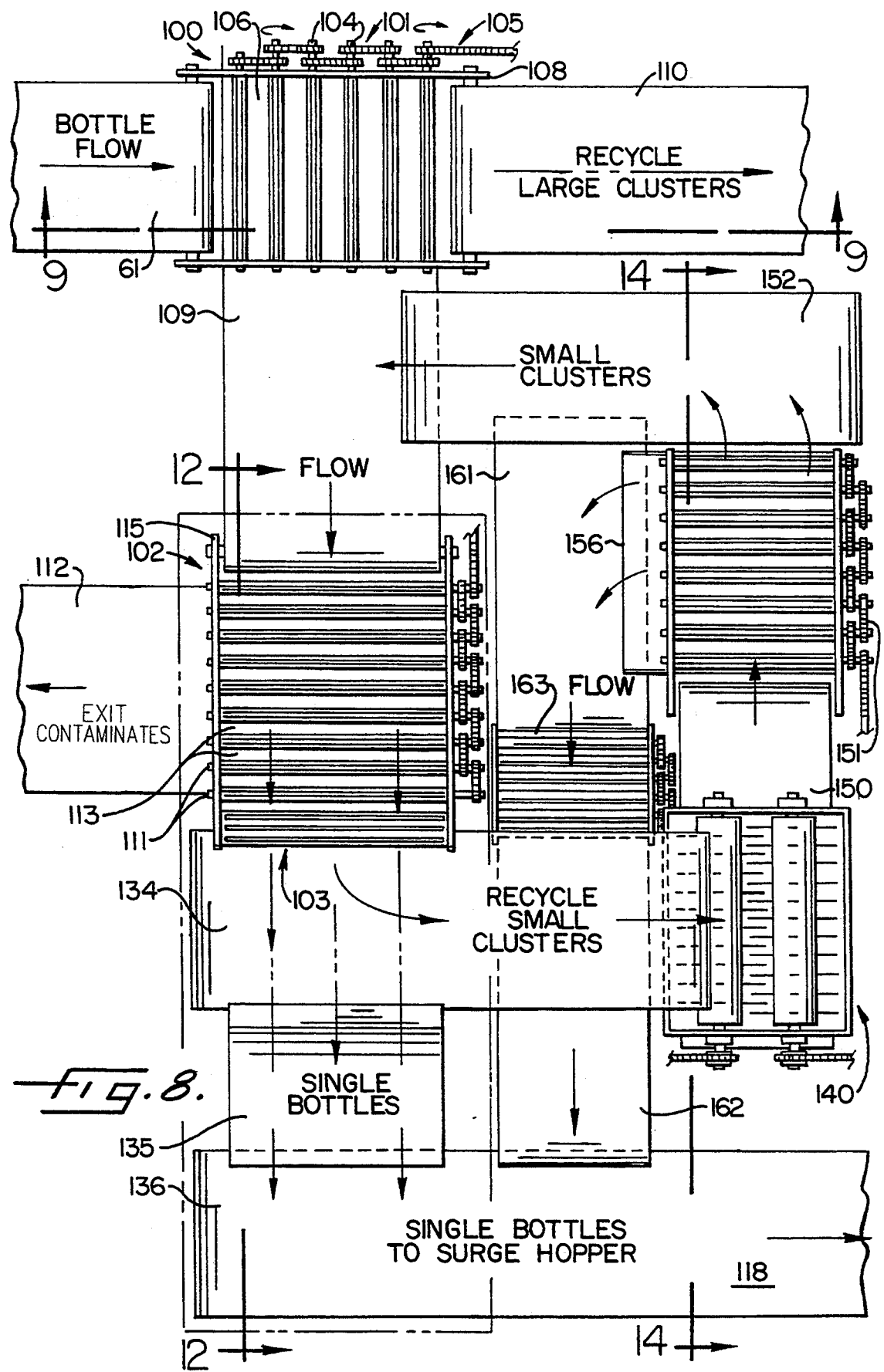
FIG. 8 is a top view of the first roller conveyor, the second roller conveyor, and the trajectory modifier of the single bottle screener, the small cluster disengagement apparatus, and belt conveyors leading to and from each apparatus.

FIGS. 8 and 9 show the single bottle screening assembly 100 of the presently preferred embodiment, in which the first screening unit comprises a large cluster roller conveyor 101, an undersized item roller conveyor 102, and a trajectory modifier 103. The large cluster roller conveyor 101 is located at the upstreammost end of the single bottle screening unit so that its upstreammost end abuts the downstreammost end of the debaler-screener belt conveyor 61. The large cluster roller conveyor 101 is oriented so that its direction of travel is parallel to that of debaler-screener belt conveyor 61. The large cluster roller conveyor 101 comprises a frame 108, rollers 104 spaced from one another to form a plurality of openings 106, and a drive unit 105. The openings 106 are of a size sufficient for passage of single bottles, small interlocked bottle clusters and unwanted undersized items, but too small for passage of large interlocked bottle clusters. As illustrated, the rollers 104 are 2 inches in diameter and the longitudinal centers of the rollers are spaced 7 inches apart. As seen in FIGS. 10 and 11, each roller 104 further comprises four friction rods 107 equally spaced circumferentially about roller 104 to promote conveyance of bottles. As illustrated, the drive unit 105 comprises a series of belts attached to a motor, but can comprise any drive means suitable for rotating the rollers 104. The downstreammost end of the large cluster screening unit 101 is adjacent to a large cluster belt conveyor 110 which leads to a large cluster disengagement apparatus 80.

During operation, the stream of items is conveyed from upstream to downstream by the rolling action of the rollers 104. Single bottles, small interlocked bottle clusters, and undersized items pass through the openings 106 onto the belt conveyor 109 located below the rollers 104. Large interlocked bottle clusters do not pass through the openings 106 and continue onto the large cluster belt conveyor 110.

The belt conveyor 109 is located directly beneath and oriented perpendicularly to the large cluster roller conveyor 101 and leads to the undersized item screening unit 102 for further screening of items passing through the openings 106 in the large cluster roller conveyor 101. In this presently preferred embodiment the undersized item screening unit 102 comprises a roller conveyor of the type described hereinabove, which includes rollers 111 that are 3 inches in diameter and are attached to a frame 115 so that the longitudinal centers of the rollers are spaced 5 inches apart. As shown in FIG. 12, this roller spacing creates a plurality of openings 113 of a size sufficient for unwanted undersized items, such as dirt, paper, and the like, to pass therethrough, but too small for single bottles and small interlocked bottle clusters. As with the large cluster roller conveyer 101, the rollers 111 further include four equally circumferentially spaced friction bars, each of which extends the length of the roller 111 parallel to the longitudinal axis of the roller. A contaminant belt conveyor 112 rests beneath the openings 113 to collect and convey away undersized contaminants passing through the openings 113.

A trajectory modifier 103, most clearly illustrated in FIG. 13, is mounted adjacent, parallel to, and downstream from the downstreammost roller 111 of the undersized item roller conveyor 102. The trajectory modifier 103 comprises a cylindrical plenum 120, three spouts 121, 124, 127 attached to the plenum 120, a pressure unit (not shown) for providing a continuous air jet through the spouts 121, 124, 127, a hood 131 which covers the undersized roller conveyor 102 and the plenum 120, and a vacuum unit 133. The plenum 120 comprises a cylindrical tube which extends the width of the undersized item roller conveyor 102 and which is mounted parallel to the rollers 111. The upstreammost spout 121 comprises a rectangular nozzle 122 which narrows from its attachment at the plenum 120 to the slotted outlet 123. The rectangular nozzle 122 is attached to the plenum 120 at its uppermost point and is angled upwardly downstream at approximately 22° to vertical. The center spout 124 comprises a rectangular nozzle 125 which narrows from its attachment at the plenum 120 to the slotted outlet 126. The rectangular nozzle 125 is attached to the plenum 120 adjacent and downstream of the upstreammost spout 121 and is angled upwardly downstream at approximately 51° to vertical. The downstreammost spout 127 comprises a rectangular nozzle 128 which narrows from its attachment at the plenum 120 to the slotted outlet 129. The rectangular nozzle 128 is attached to the plenum 120 adjacent and downstream of the center spout 124 and is angled upwardly downstream at approximately 55° to vertical. The pressure unit 130 of a type known to those skilled in this art for providing pressurized air flow is attached to the plenum 120 and provides continuous air flow through the slotted outlets 123, 126, 129. The hood 131 includes an indented funnel 132 which rests above and slightly downstream of the upstreammost spout 121. The funnel 132 has its wide end open and nearest the plenum 120 and its narrow end attached to the vacuum unit 133 for drawing air up through the funnel 132.

Perpendicularly oriented to, downstream of, and adjacently beneath the trajectory modifier 103 is the upstream end of a small cluster belt conveyor 134, which leads to a small cluster disengagement apparatus 140. A slide plate 135 comprises a flat plate inclined downwardly downstream located downstream and adjacently above the small cluster belt conveyor 134. The upstreammost end of the single bottle belt conveyor 136 lies adjacent and perpendicular to the downstreammost edge of the slide plate 135.

In operation, single bottles, small interlocked bottle clusters, and paper items emerge from the undersized item roller conveyor. The lifting force provided by the air jet from the upstreammost spout 121 in combination with the lift provided by the vacuum unit 133 is sufficient to displace a paper item but insufficient to displace a single bottle or small interlocked bottle cluster; thus paper and other lightweight items are lifted from the stream, through the funnel 132, and into a trash compactor 137. As single bottles and small interlocked bottle clusters proceed, air jets expelled through the spouts 124, 127 combine to provide a lifting force sufficient to displace a single bottle over the small cluster belt conveyor 134 and to the slide plate 135 or the single bottle belt conveyor 136, but insufficient to displace a denser small interlocked bottle cluster to the slide plate 135. Preferably, this air jet displaces a single bottle between about 1 and 3 feet.

As described above, the upstream end of the large interlocked bottle cluster belt conveyor 110 is located adjacent the downstream end of the large cluster roller conveyor 101. The large cluster belt conveyor 110 leads to a large cluster disengaging apparatus illustrated broadly at 80 in FIGS. 6 and 7. Similarly, the small cluster belt conveyor 134 leads from the downstreammost end of the trajectory modifier 103 to a small cluster disengaging apparatus illustrated broadly at 140 in FIGS. 14 and 15. Each of these cluster disengagement apparatus disengages the singles bottles within a cluster by striking the cluster with a plurality of mechanical fingers to provide sufficient torsion to overcome the interlocking forces holding the bottles together. Once disengaged, the single bottles can be conveyed back into the stream for sortation. Each cluster disengaging apparatus comprises a housing, a first movable support for mechanical fingers attached within the housing, a first plurality of fingers attached to the first movable support, a second movable support for mechanical fingers attached within the housing, a second plurality of fingers attached to the second movable support, and means for moving the support. The first movable support and the second movable support are positioned relative to each other so that as the first movable support moves the first plurality of fingers, and as the second movable support moves the second plurality of fingers, the fingers intermesh but do not contact one another.

In the preferred embodiment of the large cluster disengaging apparatus 80, a housing 81 is open on its top side to form an entrance opening 82 and on its lower side to form an exit opening 83. The movable supports comprise two drum-shaped members 84, 86 about twelve inches in diameter rotatably attached with longitudinal centers about nineteen inches apart to the side walls of the housing 81. A plurality of mechanical fingers 85, 87, each about four inches long, one and one-half inches wide and three-fourths inches thick are attached to the circumference of each drum 84, 86. The fingers 85, 87 extend radially outward from the drum surface and are regularly spaced on the drums 84, 86 both longitudinally and circumferentially, thus forming circumferential rows and longitudinal "rings" of fingers. In the illustrated embodiment, each drum includes eight circumferential rows of fingers and nine equally spaced longitudinal "rings" of fingers for a total of 72 fingers per drum. The rings are oriented on the drums 84, 86 so that the fingers 85 attached to the drum 84 intermesh with but do not contact the fingers 87 attached to the drum 85.

The means for moving the supports comprises two drive units 88, 88a which rotate the drums 84, 86 about their respective longitudinal axes in opposed angular directions; i.e., the drum 84 rotates clockwise while the drum 86 rotates counterclockwise. The drive units 88, 88a further comprise means known in this art for reversing the angular direction in which each motor drives its support responsive to means 89 for sensing when movement has halted. The drums 84, 86 will continue to reverse direction until movement is halted a predetermined number of times within a predetermined time period; when this occurs operation of the apparatus is stopped to dislodge the engaged cluster.

In operation, large clusters pass through the entrance opening 82 into the housing 81. The drums 84, 86 rotate in opposite angular directions; it is preferred that the drum 84 be rotated at an angular velocity about three times higher than that of the drum 86. The action of fingers striking the clusters disengages the individual bottles. If a single bottle or cluster is entangled in the fingers 85, 87 and prevents movement of the drums 84, 86, the drive units 88, 88a will receive a signal from the detector 89 that motion has halted and will reverse the angular direction of the drums 84, 86 in hopes of disentangling the cluster. Single bottles and clusters not disengaged by the apparatus pass out the exit opening 83 and onto a belt conveyor 90, which in turn leads to the debaler-screener conveyor 61. By this route single bottles emerging from the large cluster disengagement apparatus 80 are re-united with the stream of single bottles conveyed toward single bottle screener 100 for screening and sortation.

A small cluster disengagement apparatus, shown broadly in FIGS. 14 and 15 at 140, is located at the downstream end of the small interlocked bottle cluster conveyor 134. The basic elements and operation of the small cluster disengagement apparatus are virtually identical to those of the large cluster disengagement apparatus described hereinabove. The housing 141 is open on its top side to form an entrance opening 142 and is open on its lower side to form an exit opening 143. The movable supports comprise drum-shaped members 144, 146 twelve inches in diameter rotatably attached with longitudinal centers nineteen inches apart to the side walls of housing 141. A plurality of mechanical fingers 145, 147 five and one-half inches long, one and one-half inches wide and three-fourths inches thick are attached to the circumference of the each drum 144, 146. The fingers 145, 147 extend radially outward from the drum surface and are regularly spaced on the drums 144, 146 both longitudinally and circumferentially, thus forming circumferential rows and longitudinal "rings" of fingers. Each drum includes six circumferential rows of fingers and eleven equally spaced longitudinal "rings" of fingers for a total of 66 fingers per drum. The rings are oriented on the drums 144, 146 so that the fingers 145 attached to the drum 144 intermesh with but do not contact the fingers 147 attached to the drum 145.

The means for moving the supports comprises drive units 148, 148a which rotate the drums 144, 146 about their respective longitudinal axes in opposed angular directions; i.e., the drum 144 rotates clockwise while the drum 146 rotates counterclockwise. The drive units 148, 148a further comprise means known in this art for reversing the angular direction in which each motor drives its support responsive to means 149 for sensing when movement has halted. The drums 144, 146 will continue to reverse direction until movement is halted a predetermined number of times within a predetermined time period; when this occurs operation of the apparatus is stopped to permit the engaged cluster to be dislodged.

In operation, small clusters pass through the entrance opening 142 into the housing 141. The drums 144, 146 rotate in opposite angular directions; it is preferred that the drum 145 be rotated at an angular velocity about three times higher than that of the drum 147. The action of fingers striking the clusters disengages the individual bottles. If a cluster is entangled in the fingers 145, 147 and prevents movement of the drums 144, 146, the drive units 148, 148a will receive a signal from the detector 149 that motion has halted and will reverse the angular direction of the drums 144, 146 in hopes of disentangling the cluster. Single bottles and clusters not disengaged by the apparatus pass out the exit opening 143 and onto a belt conveyor 150.

Bottles exiting the small cluster disengaging apparatus 140 are conveyed on the belt conveyor 150 to roller conveyor 151 of the type described earlier herein. The roller conveyor 151 is present to recapture single bottles that are so densely crushed by the small cluster disengagement apparatus 140 that they would fail to be displaced by the trajectory modifier 103 to the single bottle belt conveyor 136; the roller conveyor 151 includes three inch diameter rollers mounted with longitudinal centers five inches apart, thus creating openings of a size sufficient for a single highly crushed bottle to pass therethrough, but too small for small clusters to pass therethrough. A slide plate 156 for directing highly crushed single bottles to the upstream end of a belt conveyor 161 is located beneath the roller conveyor 151; the belt conveyor 161 leads to another roller conveyor 163 for screening out bottle fragments producing by the striking action of the small cluster disengagement apparatus 140. The roller conveyor 163 leads to a belt conveyor 162, which in turn leads to the single bottle conveyor 136. Through this route dense single bottles are conveyed to be re-united with the stream of single bottles.

The downstream end of the roller conveyor 151 is located adjacent the upstreammost end of the belt conveyor 152, which leads to an intermediate section of the undersized item belt conveyor 109. Small clusters and single bottles unable to pass through the openings in the roller conveyor 151 are re-united with the stream containing single bottles, small clusters, and undersized material prior to screening by the undersized item screening unit 102. Single bottles will be displaced by the trajectory modifier 103 to the single bottle belt conveyor 136 for sortation. Small clusters will cycle through the small cluster disengagement apparatus 140 again for another attempt at disengagement.

Returning now to the main stream of single bottles, best illustrated in FIG. 16, the single bottle belt conveyor 136 leads to a surge hopper 118 comprising a large hollow chamber which stores the single bottles until they are removed for sortation. Preferably, the surge hopper 118 includes means known in the art for controlling the outgoing flow of bottles.

A PET/HDPE belt conveyor 169 extends from the exit of the surge hopper 118 to a PET/HDPE separator unit 170. The separator unit comprises five identical separator subunits 171, two of which are shown in FIG. 16, and each of which comprises an inclined belt conveyor 172, a doffer 173, and a catcher plate 177. The downstream end of the PET/HDPE belt conveyor 169 is located over the upstream end of the inclined belt conveyor 172 of the first separator subunit 171. The doffer 173, which comprises four flat blades 174 attached to a rotating hub 175, is adjustably mounted in an arcuate slot 176 just beneath the downstream end of the inclined belt conveyor 172. The catcher plate 177 is located upstream of and beneath the downstreammost end of the inclined belt conveyor 172 and is inclined downwardly. During operation, a stream of bottles is conveyed up the inclined belt conveyor 171 until each bottle drops over its downstreammost end. As the doffer blades 174 rotate, they contact only a fraction of the bottles of the stream. The remainder land on the upstreammost end of the inclined belt conveyor of the next separation subunit. Contact by a doffer blade 174 with a bottle propels the bottle against the catcher plate 177. Bottles propelled to the catcher plate 177 slide down its inclined surface and drop onto a vibrating conveyor 180. The speeds of the inclined belt conveyor 172 and the doffer 173 and the mounting height of the doffer 173 are variable to permit adjustment to a particular stream of bottles; it is preferred that the speeds be adjusted such that the stream of bottles is divided substantially equally between the five separation subunits 171 in the series.

Each separator subunit 171 leads to its own positioning unit. Positioning units comprise means for orienting a bottle into a preferred alignment for detection and means for accelerating each bottle to separate it from others in the stream for more accurate detection. The purpose of positioning units is to improve the reliability of the sortation process. Orienting the bottles so that each bottle is presented to the detector in the same manner reduces the variability of light detection for successive bottles. The preferred orientation is one in which the longitudinal axis of the bottles is substantially parallel to its direction of travel through the detector. This orientation maximizes the exposure of the bottle to the detector, thus increasing the likelihood that the detector will recognize that light has been rotated. Accelerating the bottles prior to detection minimizes the risk that two bottles will be detected simultaneously by the same detector by increasing the distance between them.

In this preferred embodiment, the orientation means comprises a vibrating conveyor shown broadly at 180 in FIG. 16. The vibrating conveyor 180 comprises a top section 181, a lower section 182, and an agitating assembly 185. The top section 181, located directly below the catcher plate 177, comprises a flat surface inclined downwardly at a shallow angle of preferably about 5 degrees. Its downstreammost edge meets the upstreammost edge of the lower section 182, which comprises five substantially semi-cylindrical chutes 183 aligned side-by-side and inclined more sharply downwardly, preferably about 30 degrees. The width of the semi-cylindrical chutes 183 is chosen to encourage a bottle to orient itself so that its longitudinal axis is substantially parallel with the longitudinal axis of the chute; a width of between 6 and 10 inches is preferred. Attached between each pair of adjacent chutes 183 are three vertical triangular dividing walls 184 which prevent bottles from descending the lower section 182 while not fully within a single chute 183. The agitation assembly 185 can be any means known by those in the art to induce a rapid short-stroke repetitive motion in an object. The preferred motion in the present embodiment is one in which the vibrating conveyor 180 follows an elliptical path. This motion further encourages a bottle to align within a chute 183.

An acceleration unit 200, broadly illustrated in FIG. 17, accelerates each bottle to distance it from the other bottles in the stream, which separation leads to more accurate detection and sortation. The acceleration unit 200 comprises an upwardly inclined acceleration belt conveyor 201 and a radial belt conveyor 203, but can comprise any means which would increase the distance between bottles in the stream. The upstreammost end of the upwardly inclined acceleration belt conveyor 201 is located adjacent to and beneath the downstreammost end of the vibrating conveyor 180. Preferably a bottle exiting the vibrating conveyor 180 travels at between 60 and 120 feet per minute; preferably the upwardly inclined acceleration belt conveyor 203 conveys a bottle at between 100 and 200 feet per minute. Meeting the downstream end of the upwardly inclined acceleration belt conveyor 201 is the upstream end of the radial conveyor 203. The radial conveyor 203 includes an arcuate conveying surface 204, the profile of which is defined by an arc such that a plane tangent to its upstream end is inclined downwardly at about at about 10 degrees to horizontal and a plane tangent to its downstream end is inclined downwardly at about 60 degrees to horizontal. The arcuate shape of the conveyor 204 surface permits a bottle to accelerate as it travels from upstream end to downstream end. In a presently preferred embodiment, the conveyor configuration causes a bottle to travel at between about 150 and 250 feet per minute at the upstream end of radial conveyor 203 and at between about 250 and 350 feet per minute at its downstream end. Each of the five positioning units 200 conveys its fractional stream to one of five HDPE/PET sorters 220. The sorter 220 is located beneath the downstream end of the radial conveyor 203. The sorter 220 comprises a slide plate 221 for controlling the distance between a bottle and camera 226 during detection, a very high output (VHO) fluorescent lamp 224 employed as the light source, a line-scan camera 226 which serves as a detector, and a plurality of air jets 229, each responsive to the camera 226, for selectively removing a bottle from the stream when the camera 226 detects a certain threshold quantity of light.

Figure 20:
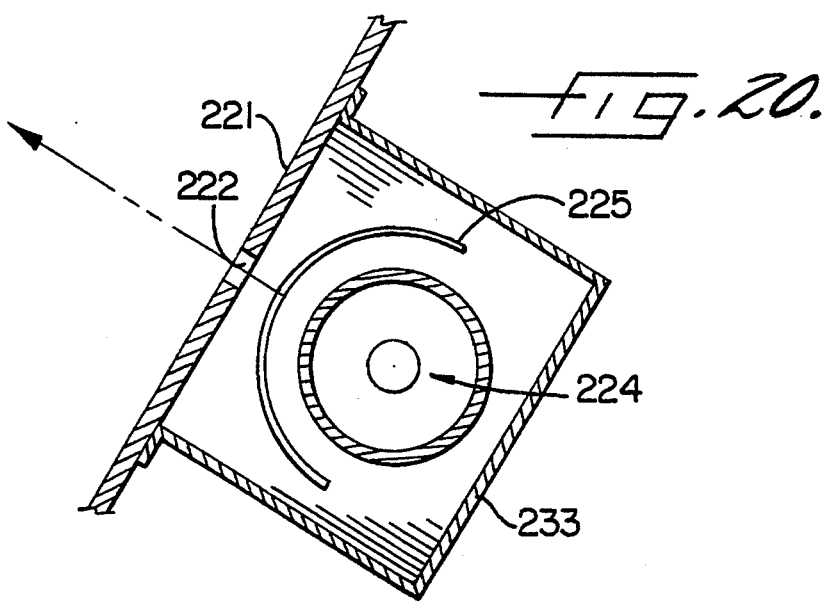
FIG. 20 is a cross-sectional view of a VHO lamp with a polarizing filter and a red filter taken along lines 20—20 of FIG. 19.
Figure 21:
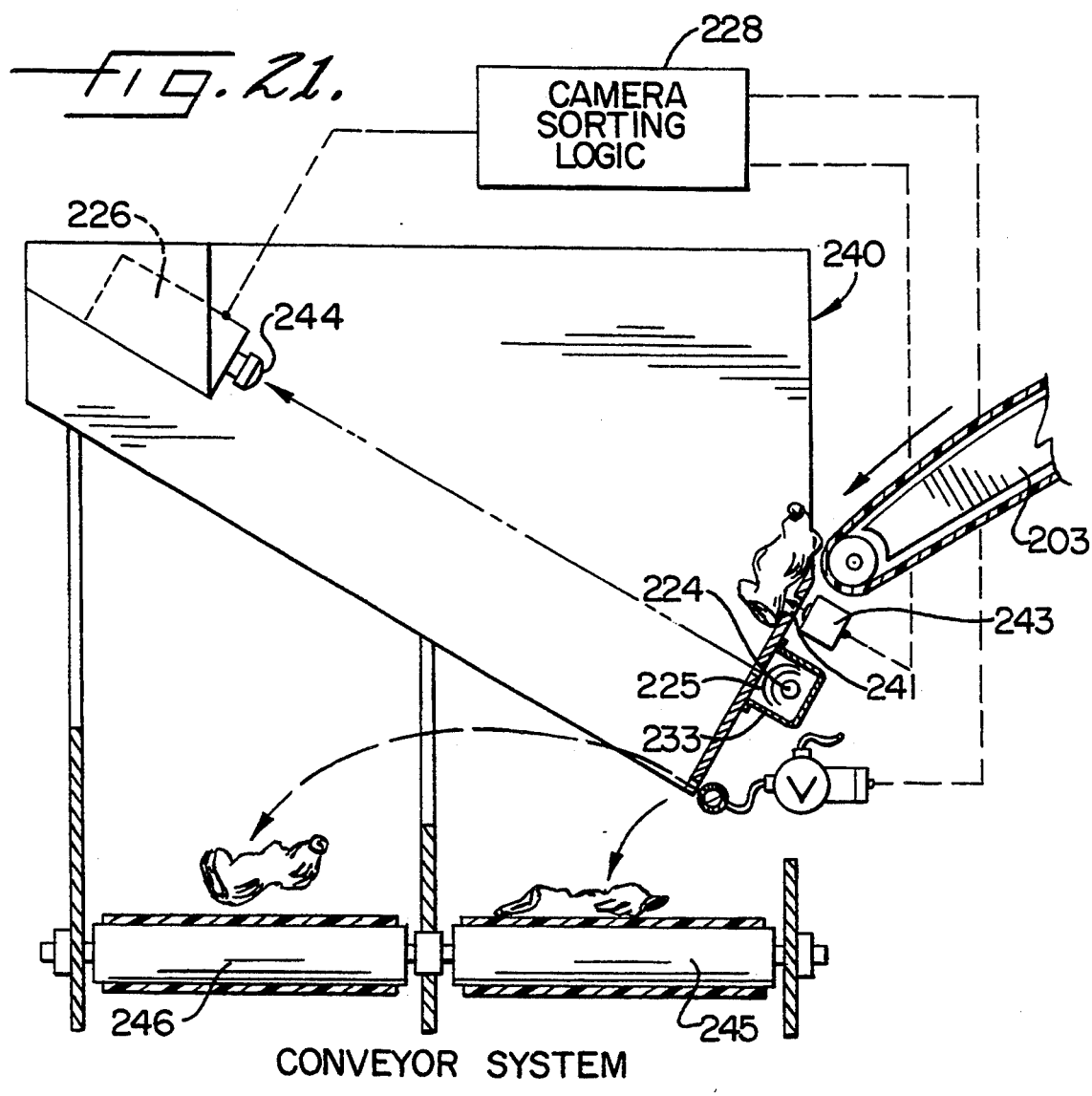
FIG. 21 is a side view of a representative PET sorter.
Figure 24:
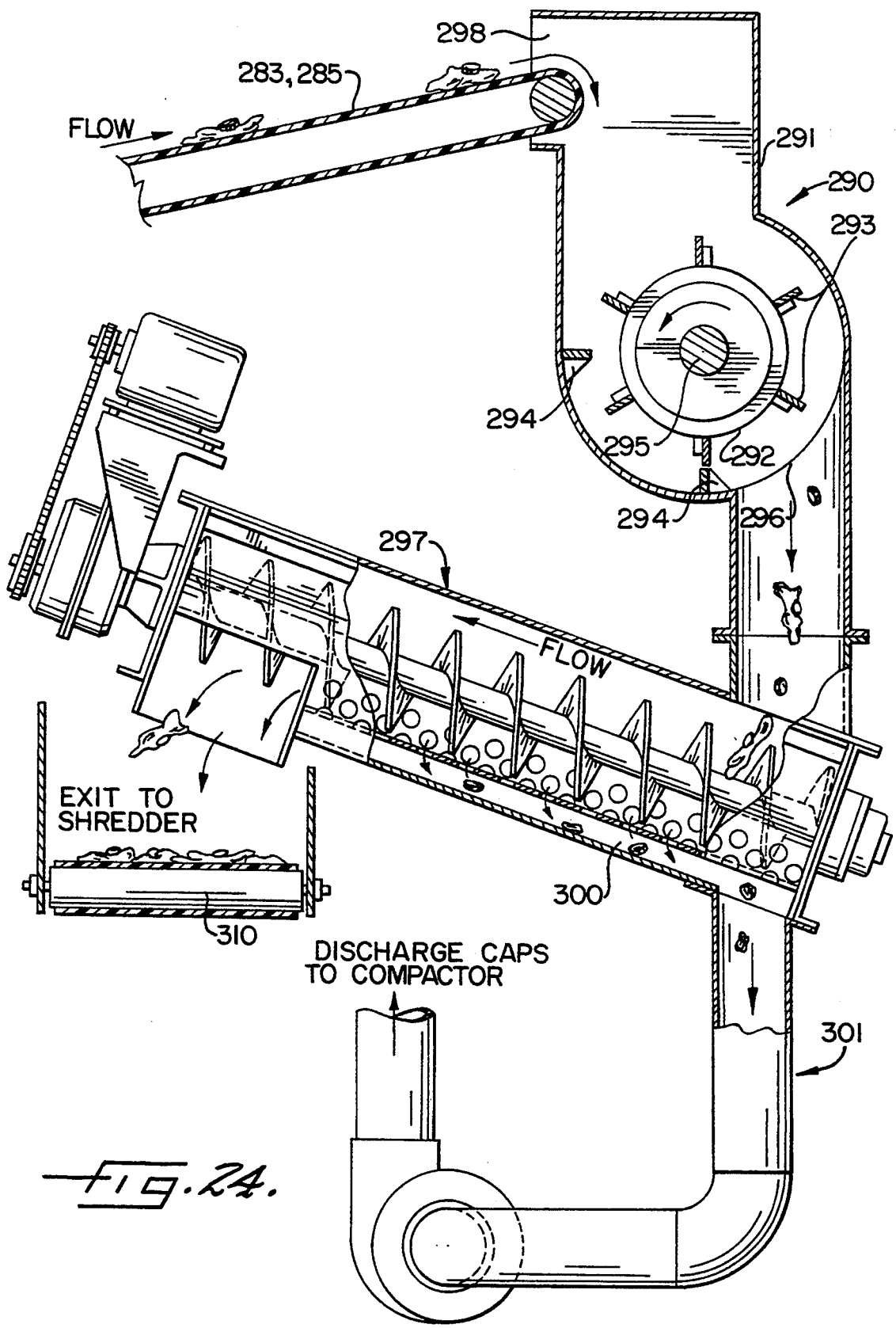
FIG. 24 is a cross-sectional front view of a decapper and decapper screening auger conveyor.

The slide plate 221, shown in FIGS. 18-20, comprises a flat surface mounted inclinedly downward with its upper edge adjacent the lower end of radial conveyor 203. The slide plate 221 includes a narrow upper light transmission slot 222 which extends horizontally across most of the expanse of the slide plate and permits the transmission of light from the lamp 224 to the stream of bottles and the camera 226. The angle of the slide plate 221 is preferably substantially the same as that of the downstream end of the radial conveyor 203 so that bottles exiting the radial conveyor are transferred smoothly to slide plate 221. The slide plate 221 provides a sliding surface for bottle travel during sensing, thus controlling the distance between the bottle and the camera 226 and producing a more accurate detection than that of a free-falling bottle.

The VHO lamp 224, shown in FIGS. 18-20, is a tubular lamp mounted just underneath the slide plate 221 parallel to the light transmission slot 222. As shown in FIG. 20, the VHO lamp 224 includes a polarizing filter 225 which filters the light emitted by the VHO lamp 224 prior to its being directed at a bottle.

The camera 226, shown in FIG. 19, is a line scan camera of the type known to those in the art which detects light and converts the received light signal into an electrical signal readable by a microprocessor. The camera 226 is mounted so that its lens 227 points directly at the light transmission slot 222. It has been discovered that orientation of the camera is important to accurate detection; a slight variation in lens orientation can create sufficient change in the quantity of light detected to render sorting somewhat inaccurate. As a result, it is preferred to mount the camera 226 on an adjustable mounting device so that final adjustments to camera orientation can be made on-line. The camera 226 is electronically connected through a microprocessor 228 with the air jets 229. As seen in FIG. 19, the lens 227 of the camera is fitted with a polarizing filter 234 oriented perpendicularly to the light source polarizing filter 225. As a result of this relative orientation, no light emitted by the VHO lamp 224 reaches the camera 226 unless the light has been rotated by a bottle as it passes between the lamp 224 the and camera 226. The light reaching the camera 226 is converted within the camera to an electrical signal which travels to the microprocessor 228. If a quantity of light exceeding a predetermined amount reaches the camera 226, the microprocessor 228 will signal the air jets 229 to remove that bottle from the stream.

The camera 226 also includes a green filter 237 through which it detects light to better distinguish between clear HDPE bottles and green PET bottles. Clear PET bottles transmit more light than green PET bottles, which transmit slightly more light than clear HDPE bottles. Colored HDPE bottles are opaque and thus do not pass light. The other bottles of the stream generally do not rotate light. Thus in theory if sufficient light is detected to indicate that a bottle is a PET bottle, that bottle is sorted, with the result being that all PET bottles are removed to a second PET stream, while all HDPE bottles and PVC bottles remain with the original stream. However, because the difference in light quantities detected for green PET bottles and clear HDPE bottles is relatively small, the camera lens 227 includes a green filter 237, which significantly decreases the amount of light reaching the camera 226 when an HDPE bottle is detected but only slightly affects the amount of light reaching the camera 226 when a green PET bottle is detected. As a result, there is an increase in the difference in light quantity detected between these two bottle types, which leads to more accurate sortation.

It should be noted that the presence of an HDPE basecup on a PET bottle does not influence the sortation process. A PET bottle with a basecup will be displaced to the PET conveyor; as described below, the HDPE of the basecups is separated in a wash step following granulation.

The air jets 229 (FIG. 18) comprise a hollow cylindrical plenum 231, five solenoids 230 electronically connected to microprocessor 228, a pressure unit (not shown) electrically connected to the solenoids 230 and pneumatically connected to the plenum 231, and a plurality of openings 233 in the plenum 231. The plenum 231 is mounted just beneath and adjacent the sortation slot 223. The openings 233 are spaced one-half inch apart and are oriented so that air flow is substantially perpendicular to the sliding surface of the slide plate 221. The air jets 229 are sufficiently forceful to displace a bottle between about 1 and 3 feet to a PET conveyor 235.

In the illustrated embodiment, the camera 226 is configured to detect five lanes of bottles simultaneously. The microprocessor 228 includes multiple channels for receiving signals from the camera 226 and sending activation signals to the appropriate solenoid 230.

An HDPE belt conveyor 236 is located directly beneath the lower edge of the slide plate 221 to collect HDPE and other bottles exiting the five HDPE/PET sorters 220 and to convey this collection to the HDPE sorters 280. The PET belt conveyor 235 is located adjacent the HDPE conveyor 236 to collect PET bottles removed from the stream by the HDPE/PET sorters 220 and to convey them to PET sorters 240.

During operation, a bottle exits the radial conveyor 203 and enters the slide plate 221. As the bottle slides down the surface of the slide plate 221, it passes over the light transmission slot 222. Light emitted from the VHO lamp 224 is directed at the bottle after passing through the polarizing filter 225. If the bottle rotates and transmits this light, some portion of the light travels through the polarizing filter 234 and is detected by the camera 226. The light detected is converted by the camera 226 into an electric signal proportionate in magnitude to the amount of light detected. The signal travels to the microprocessor 228, where it is compared in magnitude to a predetermined signal. If the magnitude of the signal from the camera 226 exceeds that of the predetermined signal, the microprocessor 228 will signal the appropriate solenoid 230 to activate the appropriate air jet 229 to displace the bottle to the PET conveyor 235. If the magnitude of the signal does not exceed the level of the predetermined signal, either because the bottle does not rotate light or transmit sufficient light, the microprocessor 228 sends no signal, and the HDPE or other bottle is permitted to slide onto the HDPE belt conveyor 236.

Following first the PET fraction, the PET belt conveyor 235 leads to the PET separation unit 238, which is identical to an HDPE/PET separation unit 170 described above except that it comprises only three dividing subunits 239. Each of these subunits 239 leads to a positioning unit 250 and an acceleration unit 251 identical to that already described. The PET sorters 240 employed for the sortation of clear and green PET bottles differ from those described hereinabove only in that the camera 226 does not include a green filter 237, both the camera 226 and the VHO lamp 224 further comprise a red filter 244, and the PET sorter 240 further comprises a proximity detector 243.

The red filter 244 is included in the PET sorters 240 because although green PET bottles and clear PET bottles do not transmit light identically, and thus could be sorted as described above, it is preferred that the difference in light detected for green PET bottles and light detected by clear PET bottles be as great as possible. The red filter 244 absorbs most of the light which passes through green PET bottles with the result that little light reaches the camera 226 when light is directed at a green bottle. Clear PET bottles still pass light in an amount detectable by the camera, and will thus signal the microprocessor 228 that light rotation has occurred.

It is desirable to remove the lesser fraction of any stream of bottles for two reasons. First, removing the lesser fraction lowers energy costs by reducing the number of times that air jet operates. Second, sortation accuracy is improved, because any imprecision in the bottle removal step, such as insufficient light rotation or an insufficiently forceful or misdirected air jet, will affect only the lesser fraction of bottles; the greater fraction of bottles is unaffected by the performance of the air jet and thus will end up correctly remaining with the stream. Thus the percentage of errors is decreased by sorting the lesser fraction rather than the greater fraction. In a typical stream, clear PET bottles comprise approximately 80 percent of all PET bottles. Thus in the sortation system as described herein, the air jet 229 would operate to remove approximately 4 of every 5 bottles. As a result, the sortation logic of the PET sorters 240 is reversed so that green PET bottles are sorted from the stream.

The proximity detector 243 can be any device known in the art to be suitable for detecting the presence of an object. It is mounted on the underside of the slide plate 221 just above the VHO lamp 224. The slide plate 221 includes a second proximity detection slot 241 located just above the light transmission slot 222 through which the proximity detector 243 detects the presence of a bottle. The proximity detector 243 is also electronically connected to the microprocessor 228.

In operation, the proximity detector 243 continuously scans through proximity detection slot 241 to see if an object is present. When the proximity detector 243 detects the presence of a bottle, it signals the microprocessor 228. If the microprocessor 228 then receives a signal from the camera 226 that sufficient light was transmitted by the bottle, this indicates that a clear PET bottle is in position for sortation, and the microprocessor 228 fails to activate any solenoid 230. As a result, the clear PET bottle is allowed to fall to the clear PET belt conveyor 245 located beneath the lower edge of the slide plate 221. If instead after the microprocessor 228 has received a signal from the proximity detector 243 that a bottle is present it receives no signal from the camera 226 that sufficient light has reached the detector, this indicates a green PET bottle, so the microprocessor 228 signals the appropriate solenoid 230 to activate the air jets 229 to displace the bottle to a green PET belt conveyor 246 located adjacent a clear PET belt conveyor 245. If no signal is received from the proximity sensor 243, no bottle is present, so the air jet does not operate.

The green PET conveyor 246 leads to a final green PET processing station 247 wherein green PET bottles are granulated and washed by known methods. Similarly, the clear PET belt conveyor 245 leads to a final clear PET processing station 248 wherein clear PET bottles are granulated and washed by known methods. It is at this point that the HDPE of basecups is separated from the PET. The HDPE granules float on the wash water, while the denser PET granules sink. As a result, the HDPE can be skimmed from the wash water surface.

Turning now to the fraction of HDPE and other bottles exiting the HDPE/PET sorters 220, the HDPE belt conveyor 236 collects this fraction and conveys these bottles to a screening auger conveyor 260 illustrated in FIGS. 22 and 23. The screening auger conveyor 260 is of a type known to those in the art comprising an elongate U-shaped a housing 261, a rotatable threaded auger 265 attached at either end of housing 261 for conveying bottles, and a drive unit 266 for rotating the auger 265. The U-shaped housing 261 includes an entrance opening 262, an exit opening 263, and a plurality of round openings 264 of sufficient area for passage of contaminants but of insufficient area for passage of bottles.

The stream of HDPE and other bottles exiting the HDPE/PET sorters 220 contains all material not removed from the original stream by the PET sorters 220. This stream can still contain contaminants which will adversely affect the final HDPE product. As the stream is conveyed through the entrance 261, the drive unit 266 rotates the threaded auger 265 and thereby conveys the bottles within the stream to the exit opening 263. The smaller contaminants pass through the openings 264 and drop onto a funnel 268 and slide therefrom onto a contaminant belt conveyor 269 for disposal. The HDPE and other bottles exiting auger the conveyor 260 drop onto a second HDPE belt conveyor 267 for conveyance to further sortation.

The upstreammost end of the HDPE belt conveyor 267 leads to the a HDPE separation unit 270, which is identical to the HDPE/PET separation unit 170 described hereinabove except that it comprises only three dividing subunits 271. Each subunit 271 leads to a positioning unit 272 and an acceleration unit 273 identical to that already described herein. The HDPE sorters 280 employed for the sortation of clear HDPE from colored HDPE and other bottles differ from those described above for the HDPE/PET separation only in that the camera 226 has no green filter 237 and the HDPE/PVC sorters 280 further comprise a proximity detector 281 for reversing the sortation logic.

In a typical stream, the large majority of bottles will be clear HDPE bottles. As clear HDPE bottles rotate light but colored HDPE and other bottles do not, concerns about accuracy and energy savings point to a reversal of logic as described hereinabove for the separation of PET; accordingly, the HDPE sorters 280 further comprise a proximity detector 281 connected to the air jets 229 to detect when a bottle is in position for detection. The sorting logic follows the pattern described for PET separation. When the microprocessor 228 receives a signal from the proximity detector 281 that a bottle is present, then receives a signal from the camera 226 that light was rotated by that bottle, this indicates that a clear HDPE bottle is in position for sortation, and it is allowed to fall unsorted to a clear HDPE belt conveyor 283. When instead the microprocessor 228 receives a signal from the proximity detector 281 that a bottle is present, but receives no signal from the camera 226 that light has been rotated, this indicates that a colored HDPE or other bottle is in position for sorting, and the appropriate air jet 229 operates to displace that bottle to a colored HDPE/other bottle belt conveyor 285. If no signal is received from the proximity sensor 281, the air jet 229 does not operate.

The clear HDPE belt conveyor 283 and the colored HDPE/other bottle belt conveyor 285 each lead to a decapper 290 shown broadly in FIG. 23. Each decapper 290 comprises a chamber 291 having an entrance opening 298 and an exit opening 296, two stationary blades 294 attached to the inner wall of the chamber 291 and extending perpendicularly from the inner wall, a rotatable hub 292 having six striking blades 293 equally spaced circumferentially about and extending radially outwardly from the rotatable hub 292, and a drive unit 295 for the rotatable hub 292. The outermost striking edge of each of the striking blades 293 moves into parallel adjacent but noncontacting relation with the contact edge of the stationary blades 294 as the rotable hub 292 rotates. A preferred clearance between the contact edge and the striking edge is $\frac{1}{4}$ to $\frac{3}{8}$ inches.

In operation, bottles pass through the entrance opening 298 into the chamber 291. The striking blades 293 rotate and in doing so strike each bottle. The contact forces the bottle against a stationary blade 294, at which point the bottle is crushed with sufficient force to disengage the cap.

The housing exit opening 296 empties into a screening auger conveyor 297 of the type described hereinabove. The conveyor housing includes round openings of a size sufficient for caps to pass therethrough but too small for bottles to pass therethrough. Beneath the openings is an inclined tunnel 300 leading to a vacuum unit 301. Caps removedfrom bottles pass through the openings in the conveyor, slide down the inclined surface of the tunnel 300, and pass into the vacuum unit 301 for disposal. Bottles are conveyed through the exit of the conveyor and to a belt conveyor 310 leading to a shredder and then to a final processing station 320 where the bottles are granulated and washed. It is at this point that other plastics are separated from colored HDPE; in the washing step, the granules of this other plastics are more dense than the wash water and sink to the bottom of the wash basin. The HDPE granules float on the wash water and thus can be skimmed through known techniques. The granules of other plastics are then discarded.

The drawings and specification disclose typical preferred embodiments of the invention and, although specific terms are employed, they are used in a generic and descriptive sense only and not for purposes of limitation, the scope of the invention being set forth in the following claims.

That which is claimed is:

1. A method of separating individual plastic items from a mixture of plastic items, and that is particularly useful in recovering recyclable plastics from waste sources such as municipal waste, and in which each of the individual items is formed predominantly of a single type of plastic, but in which different individual items within the mixture are made of different types of plastic, the method comprising:

measuring the effect that each individual item has on light of a predetermined character directed at the item from a source and measured with a line scan camera detector opposed to the source as a sliding stream of the items is successively directed past the source and the line scan camera; and selectively removing individual items from the sliding stream based upon a comparison of the light produced by the source and any light received by the line scan camera detector.

2. A method according to claim 1 wherein the step of measuring the effect on light polarized by the first polarizer further comprises:

directing light from the source through a first polarizer prior to directing the light at the items in the stream; and measuring the light through a second polarizer after the light has passed through the item, and wherein the second polarizer is oriented perpendicularly to the first polarizer, so that in the absence of rotation of polarized light by an item, the first and second polarizers prevent light from the source from reaching the detector, but wherein rotation of light by an item permits light from the source to reach the detector.

3. A method according to claim 1 further comprising the step of determining whether an individual item is proximate to the source and detector so that an item is removed if it is determined that an item is proximate to the source and detector and if no light is detected by the detector as an item passes.

4. A method according to claim 1, wherein the step of measuring the effect further comprises directing the light from the source through a first colorizing filter prior to directing the light at the item and directing the light through a second colorizing filter after directing the light through the item so that most of the light rotated by clear items reaches the detector, but most of the light rotated by certain colorized items does not reach the detector.

5. A method according to claim 1 wherein the step of measuring the effect comprises measuring the effect that an item has on the light that will define the mixture into two fractions, and wherein the step of selectively removing individual items from the stream comprises selectively removing the lesser fraction from the stream so that the greater fraction continues as a stream.

6. A method according to claim 5 further comprising the steps of:

measuring the effect that each item in the greater fraction has on the light as a stream of the items in the greater fraction is successively directed past a light source and said detector; and selectively removing individual items from the greater fraction based on a comparison of the light produced by the source and any light received at the detector.

7. A method according to claim 6 and further comprising the step of repeating the steps of claim 6 until a desired number of fractions have been separated.

8. A method according to claim 5 further comprising the steps of:

measuring the effect that each item in the lesser fraction has on the light as a stream of the items in the lesser fraction is successively directed past a light source and a line sign camera detector; and selectively removing individual items from the lesser fraction based on a comparison of the light produced by the source and any light received at the detector.

9. A method according to claim 8 and further comprising the step of repeating the steps of claim 8 until a desired number of fractions have been separated.

10. A method according to claim 1, wherein the step of measuring the effect that each individual item has on light of a predetermined character comprises measuring the effect that each individual bottle in a stream of plastic bottles has on light of a predetermined character directed at the bottle and measured at a line scan detector camera opposed to the source as a stream of plastic bottles is successively directed past the source and the detector.

11. A method according to claim 10, wherein the stream of plastic bottles is a mixture of types of plastic bottles selected from the group consisting of: clear polyethylene terephthalate bottles, green polyethylene terephthalate bottles, clear high density polyethylene bottles, colored high density polyethylene bottles, polyvinylchloride bottles, polypropylene bottles, polycarbonate bottles, and polystyrene bottles.

12. A method according to claim 11 wherein the step of selectively removing individual bottles from the stream comprises removing any clear polyethylene terephthalate bottles and green polyethylene terephthalate bottles from the stream so that any clear high density polyethylene bottles, colored high density polyethylene bottles, polyvinylchloride bottles, polypropylene bottles, polycarbonate bottles, and polystyrene bottles remain in the stream.

13. A method according to claim 10, wherein the stream of plastic bottles is a mixture of types of plastic bottles selected from the group consisting of clear polyethylene terephthalate bottles and green polyethylene terephthalate bottles, and wherein the step of selectively removing individual bottles from the stream comprises removing any green polyethylene terephthalate bottles so that any clear polyethylene terephthalate bottles remain in the stream.

14. A method according to claim 10 wherein the stream of plastic bottles is a mixture of types of plastic bottles selected from the group consisting of clear high density polyethylene bottles, colored high density polyethylene bottles, polyvinylchloride bottles, polypropylene bottles, polycarbonate bottles, and polystyrene bottles and wherein the step of selectively removing individual bottles from the stream comprises removing any colored high density polyethylene bottles and polyvinylchloride bottles polypropylene bottles, polycarbonate bottles, and polystyrene bottles from the stream so that clear high density polyethylene bottles remain in the stream.

15. A method according to claim 10 wherein the step of selectively removing individual plastic bottles from the stream comprises directing a jet of air against a bottle selected for removal to displace it from the stream.

16. A method according to claim 10, which further comprises the step of positioning the plastic bottles into a preferred orientation which maximizes the exposure of the bottle between the light source and the detector, a preferred position relative to the detector which maximizes the accuracy of detection, and a preferred distance from other bottles in the stream which minimizes the risk of detecting more than one bottle at once prior to the step of measuring the effect.

17. A method according to claim 16, wherein the step of positioning the bottles in a preferred orientation comprises aligning a bottle such that its longest axis will be substantially parallel with its path of travel during the step of measuring the effect.

18. A method according to claim 16, wherein the step of positioning the bottle to a preferred from other bottles in the stream prior to the step of measuring the effect comprises accelerating the bottle to a rate of travel of between 250 and 350 feet per minute to linearly separate each bottle from the others in the stream.

19. A method according to claim 16, wherein the step of positioning the plastic bottles into a preferred position relative to the detector comprise directing a bottle downwardly along a surface inclined at between about 40 and 70 degrees to horizontal during the step of measuring the effect.

20. An apparatus for separating individual plastic items from a mixed stream of plastic items, and that is particularly useful in recycling plastic items from waste sources such as municipal waste, and in which each of the individual plastic items is formed predominantly of a single type of plastic, but in which different individual items within the mixture are made of different types of plastic, the apparatus comprising:
   (a) a conveyor for presenting a sliding stream of items;
   (b) a light source for emitting light of a predetermined character;
   (c) a line scan camera detector opposed to said light source for measuring the effect each individual sliding item has on light emitted by said light source as a stream of sliding individual items is successively directed between said light source and said line scan camera detector; and
   (d) sortation means responsive to said line scan camera detector for selectively removing individual sliding items from the stream based on a comparison of the light produced by said source and any light detected by said line scan camera detector.

21. An apparatus according to claim 20 in which said light source includes a first polarizer located between said light source and the stream of individual items for rotating light emitted by said light source; and in which said detector includes a second polarizer located between the stream of items and said detector for rotating light which passes through the individual item, and in which said second polarizer is oriented perpendicularly to said first polarizer, such that virtually no light reaches the detector unless individual items in the stream rotate the light exiting the first polarizer so that detection of light at the detector indicates of the presence of an item.

22. An apparatus according to claim 21 which further comprises proximity sensing means for determining when an item is in position to pass between said light source and said detector.

23. An apparatus according to claim 22, in which said sortation means is also responsive to said proximity sensing means so that if said proximity sensing means detects the presence of an item and said detector detects insufficient transmission of light by an item, said sortation means will remove the item from the stream, and if said proximity sensing means detects the presence of an item and said detector detects sufficient light, said sortation means will not remove the item from the stream.

24. An apparatus according to claim 20, in which said light source further comprises a colorizing filter located between said light source and said stream of items for filtering light of a particular color.

25. An apparatus according to claim 24, in which said colorizing filter is a red filter.

26. An apparatus according to claim 20, in which said detector further comprises a colorizing filter located between said stream of items and said detector for filtering light of a particular color.

27. An apparatus according to claim 26, in which said colorizing filter is a red filter.

28. An apparatus according to claim 26, in which said colorizing filter is a green filter.

29. An apparatus according to claim 20, in which said sortation means comprise means for directing a jet of air at the item to be removed from the stream.

30. An apparatus according to claim 20 and further comprising means for positioning an item in a preferred orientation that maximizes the exposure of the item between said light source and said detector, means for positioning an item relative to said detector that maximizes detection accuracy, and means for positioning an item relative to other items in the stream to minimize the risk of detecting more than one item at once.

31. An apparatus according to claim 30, in which said means for positioning an item relative to said detector comprises a sliding surface inclined downwardly at an angle of between about 40 and 70 degrees to horizontal located between said light source and said detector for controlling the path of an item between said light source and said detector.

32. An apparatus according to claim 30, in which said means for positioning an item relative to other items in the stream comprises a series of conveyors, said conveyors being configured such that each successive conveyor conveys the item at a rate of travel exceeding that of the previous conveyor to thereby increase the distance between items as they progress from conveyor to conveyor.

33. An apparatus according to claim 30, in which said means for positioning a bottle in a preferred orientation comprises a substantially semi-cylindrical chute, the diameter of said semi-cylindrical chute being larger than the width of an item but smaller than the length of an item so that the item is oriented with its longitudinal axis being substantially parallel with the longitudinal axis of said semi-cylindrical chute.

34. An apparatus according to claim 30, in which said means for aligning a bottle includes vibrating means for agitating a bottle into an orientation wherein its longitudinal axis is substantially parallel with the longitudinal axis of said semi-cylindrical chute.

35. An apparatus according to claim 20 further comprising:
   a plurality of line scan camera detectors, each of said detectors being configured to detect the effect of an item on light directed at the item from said light source; and
   a plurality of sortation means, each of said sortation means being responsive to one of said detectors.

* * * * *

UNITED STATES PATENT AND TRADEMARK OFFICE
CERTIFICATE OF CORRECTION

PATENT NO. : 5,344,026
DATED : September 6, 1994
INVENTOR(S) : Booth et al.

It is certified that error appears in the above-indentified patent and that said Letters Patent is hereby corrected as shown below:

Column 7, Line 23, after "converyor" delete "2C0" and insert –260–.

Column 15, Line 28, after "conveyor" delete "203" and insert –201–.

Column 20, Line 23, after "Caps" delete "removedfrom" and insert –removed from–.

Signed and Sealed this

Sixth Day of December, 1994

Attest:

BRUCE LEHMAN

*Attesting Officer*  *Commissioner of Patents and Trademarks*